April 5, 1966 R. G. HERB ETAL 3,244,969
ELECTRON ORBITING TUBES FOR ION MEASUREMENT AND GETTERING PUMPS
Filed Dec. 20, 1963 9 Sheets-Sheet 2
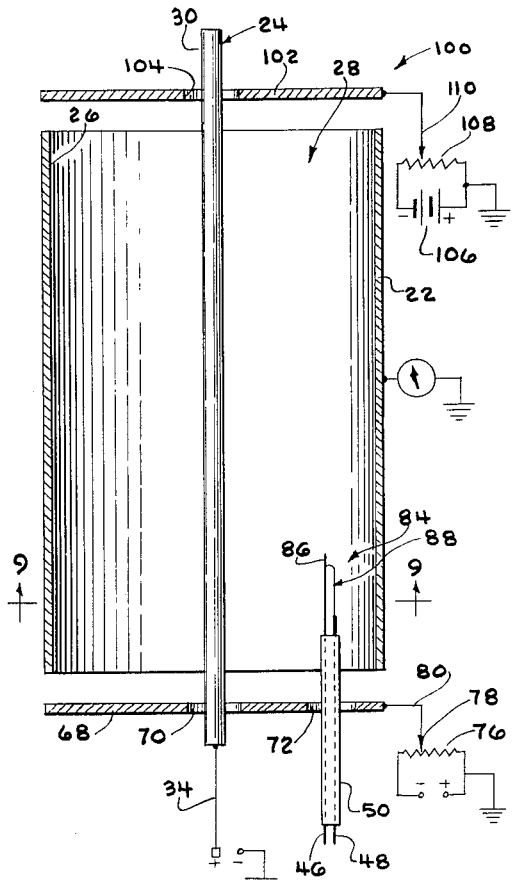
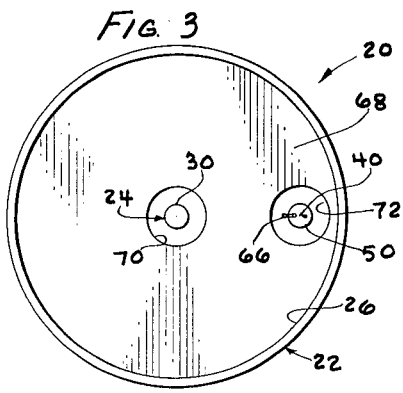
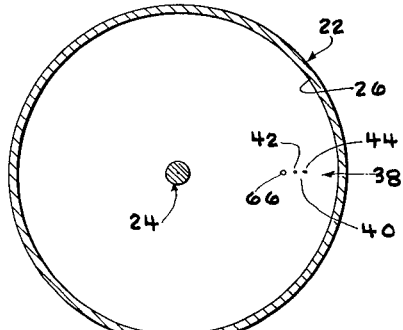
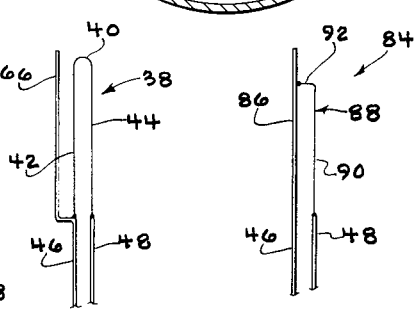
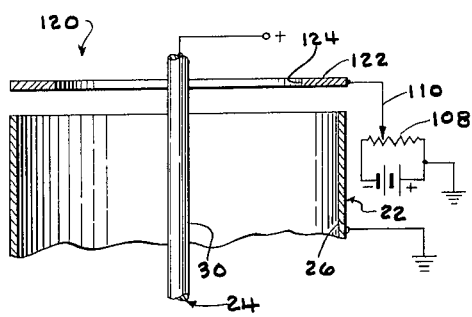
RAYMOND G. HERB
THEODORE E. PAULY
INVENTORS
BY Ooms, McDougall & Hersh
ATT'YS.

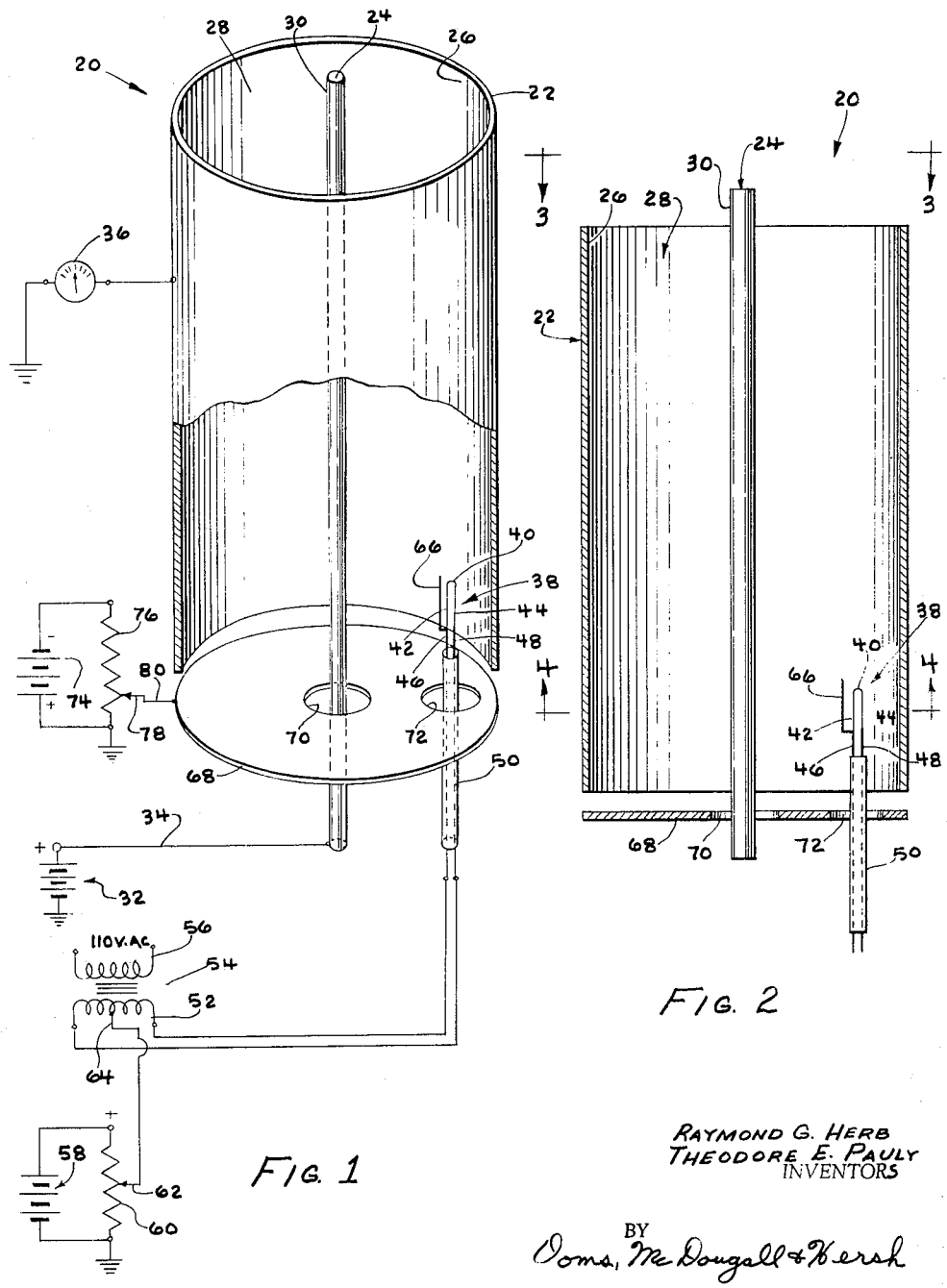

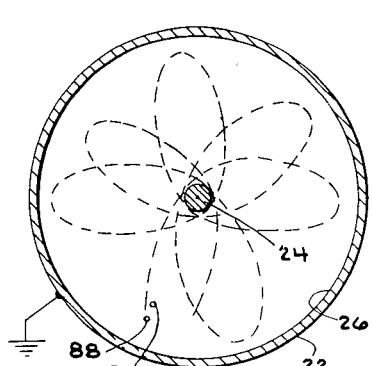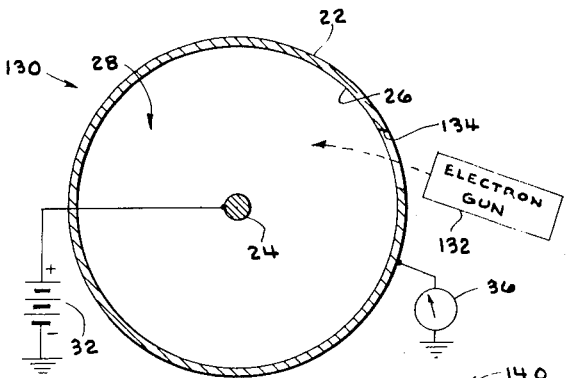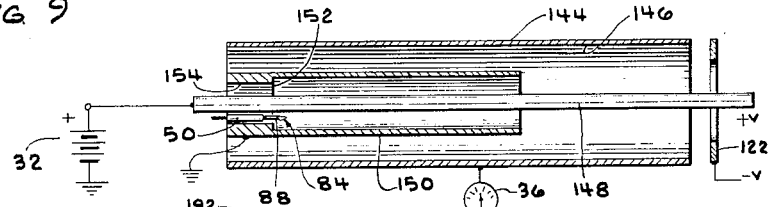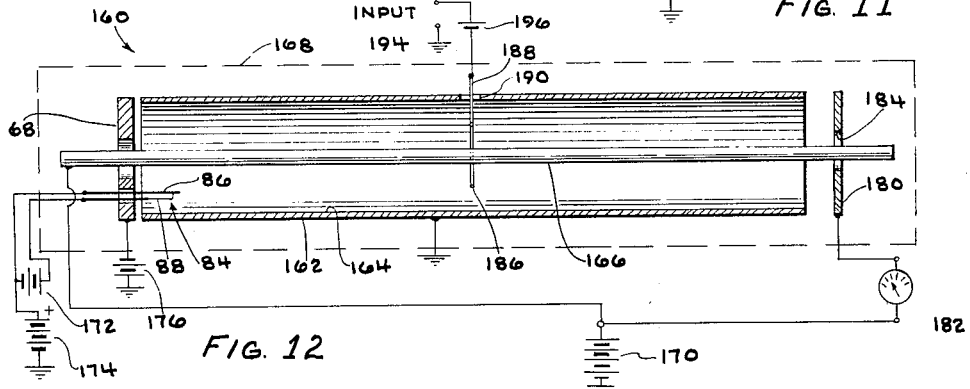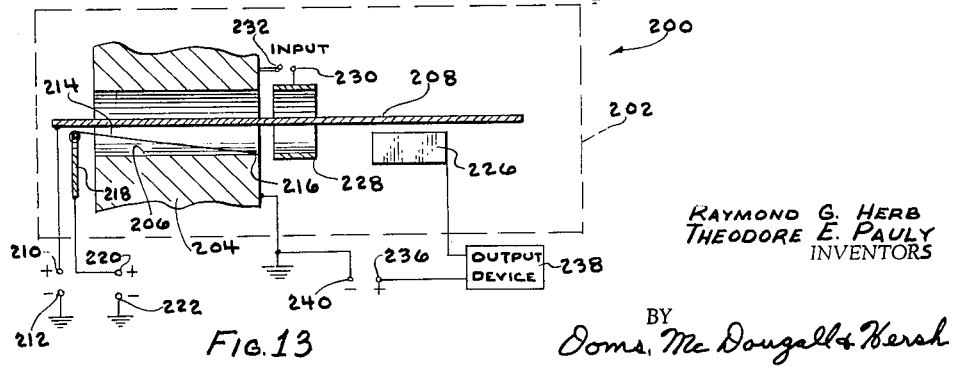

April 5, 1966 R. G. HERB ETAL 3,244,969
ELECTRON ORBITING TUBES FOR ION MEASUREMENT AND GETTERING PUMPS
Filed Dec. 20, 1963 9 Sheets-Sheet 4
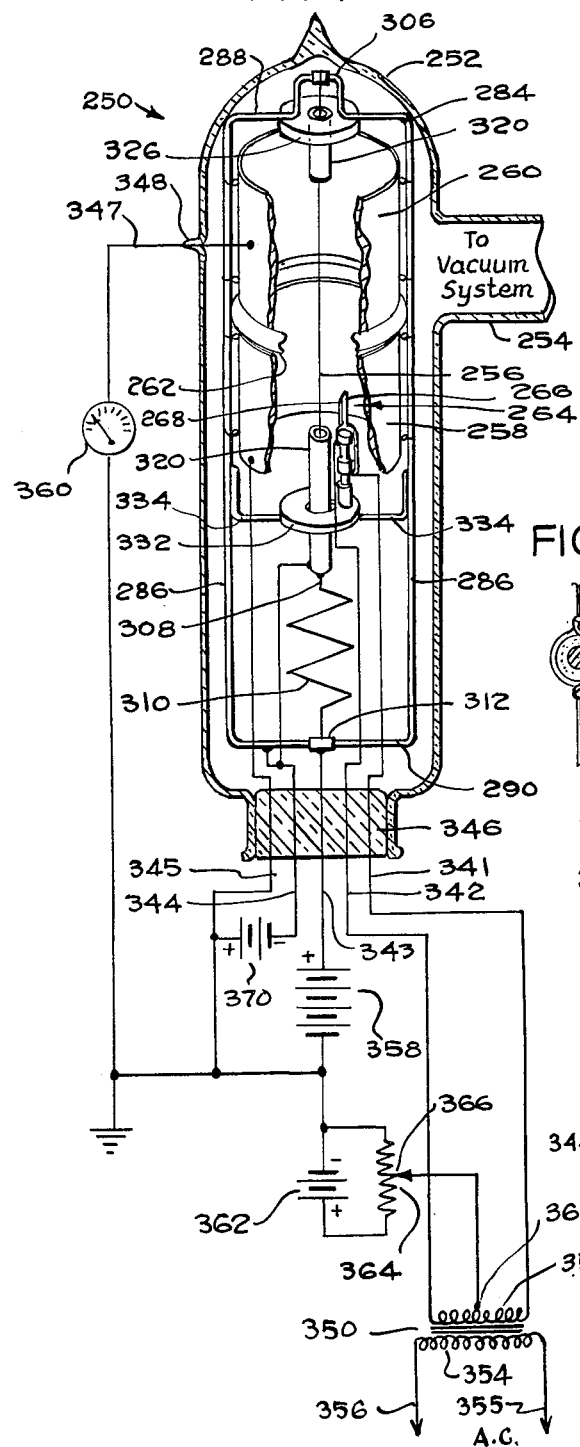
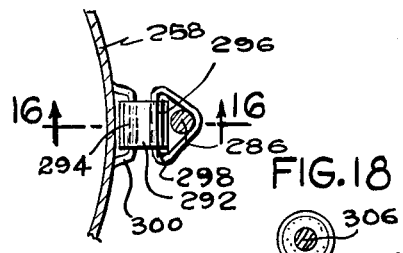
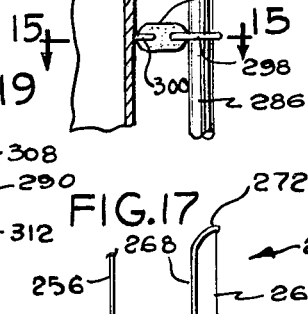
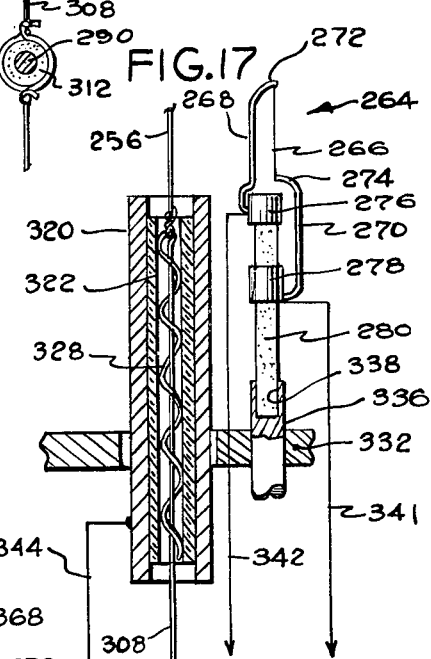
INVENTORS
Raymond G. Herb
Theodore E. Pauly
BY Ooms, McDougall & Hersh
Attorneys

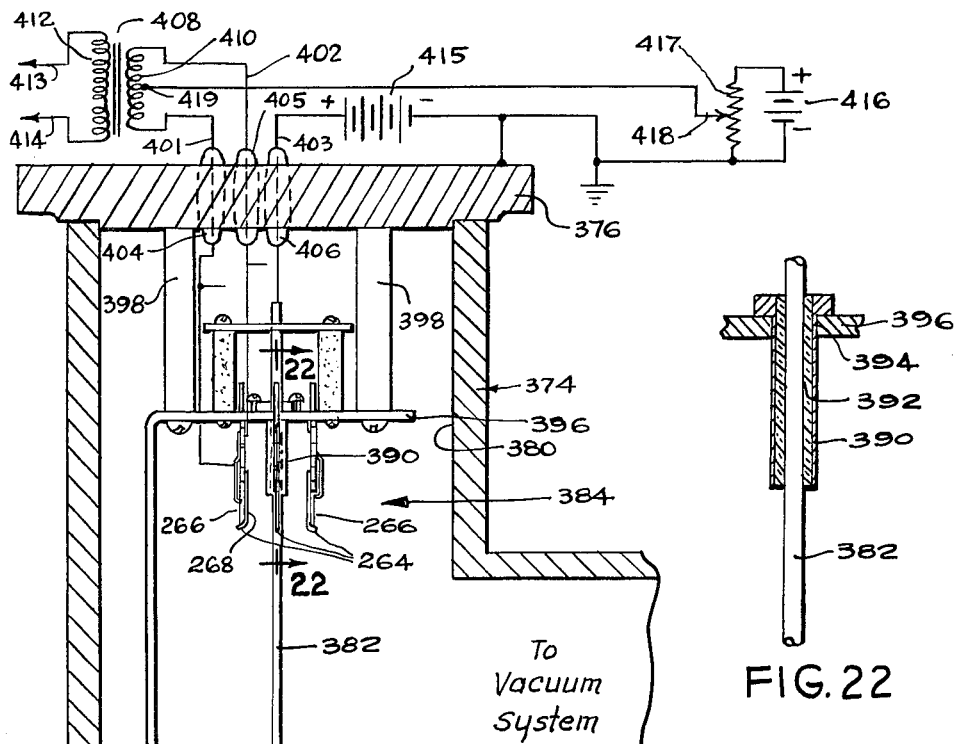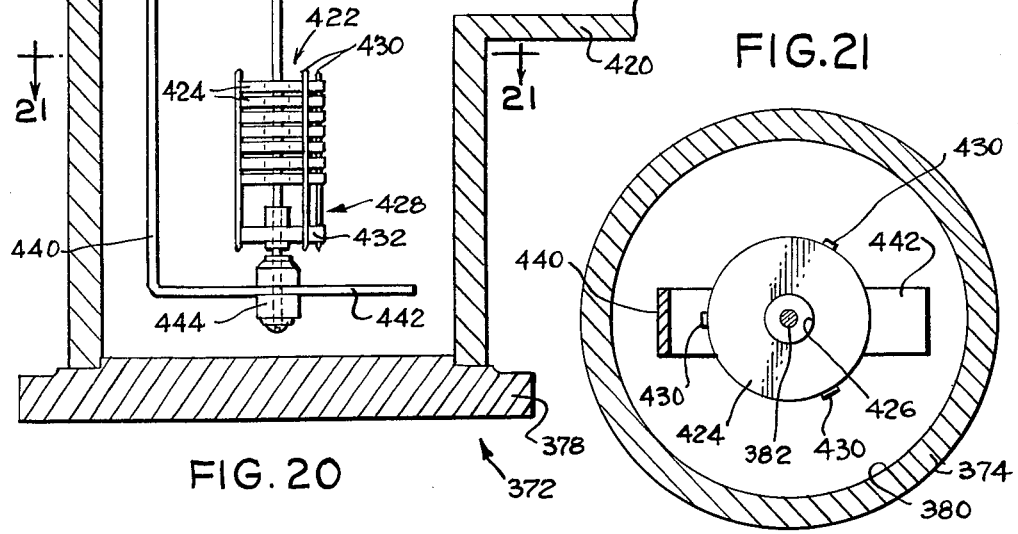

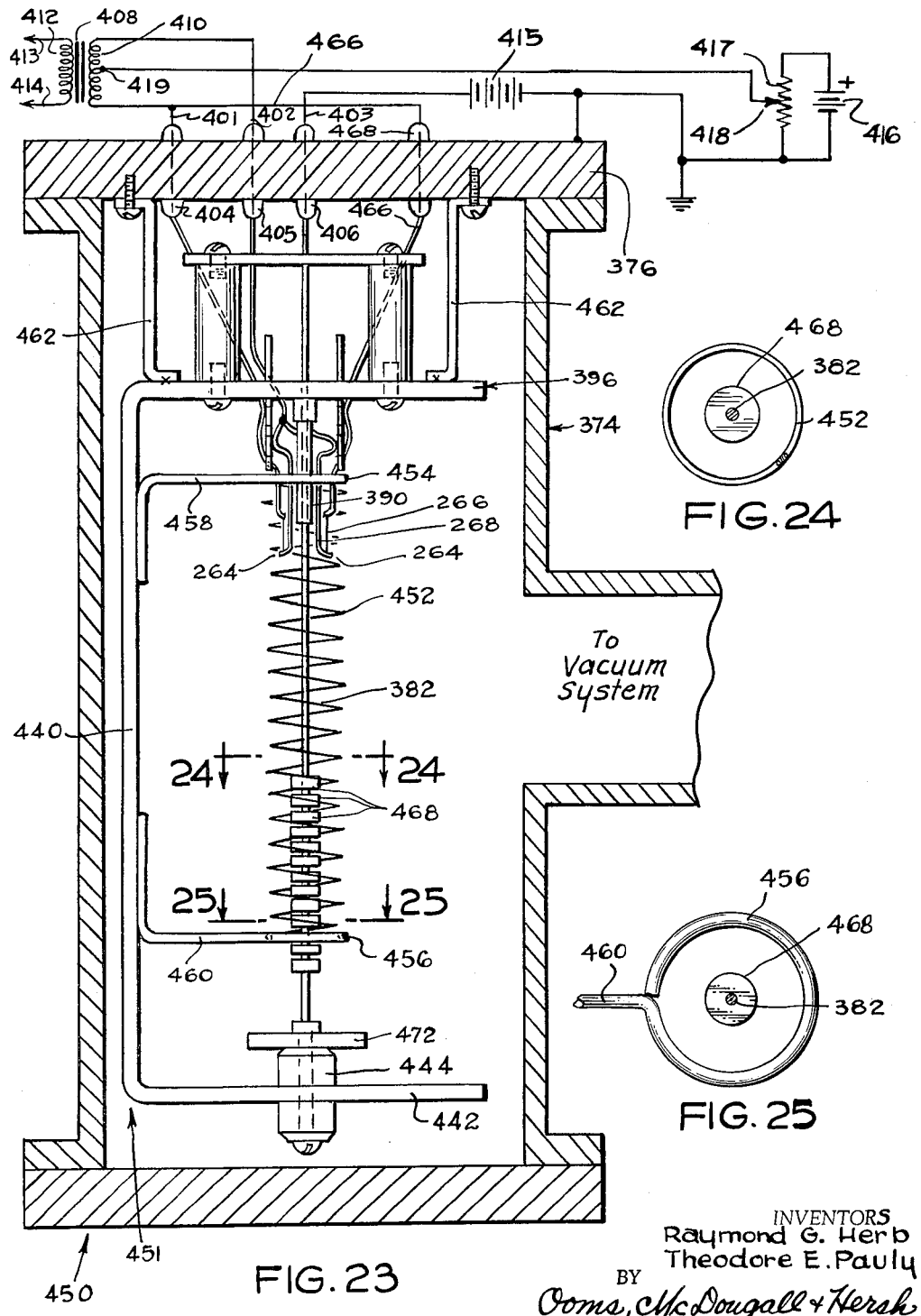

April 5, 1966  R. G. HERB ETAL  3,244,969
ELECTRON ORBITING TUBES FOR ION MEASUREMENT AND GETTERING PUMPS
Filed Dec. 20, 1963  9 Sheets-Sheet 8
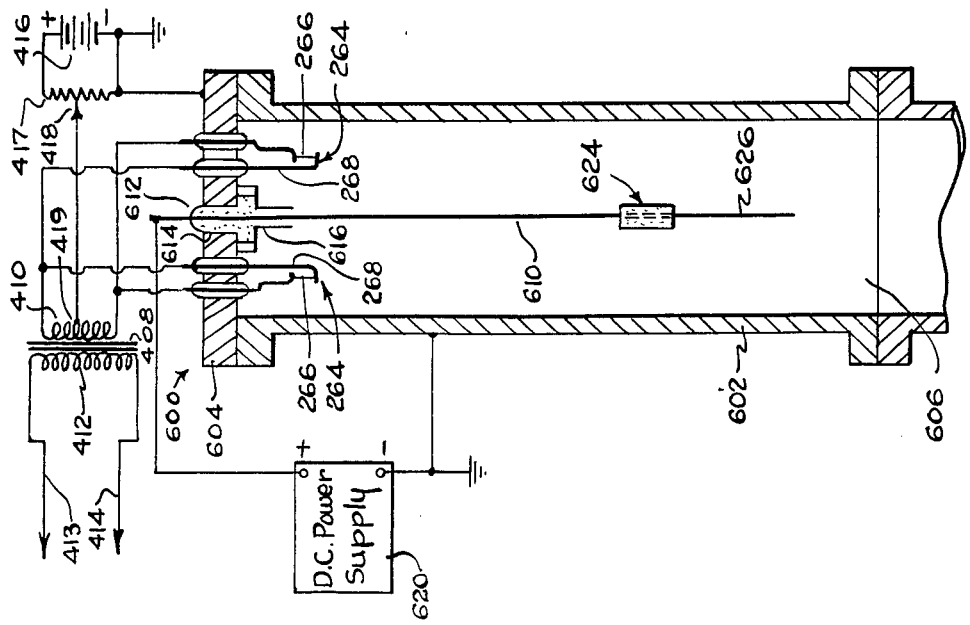
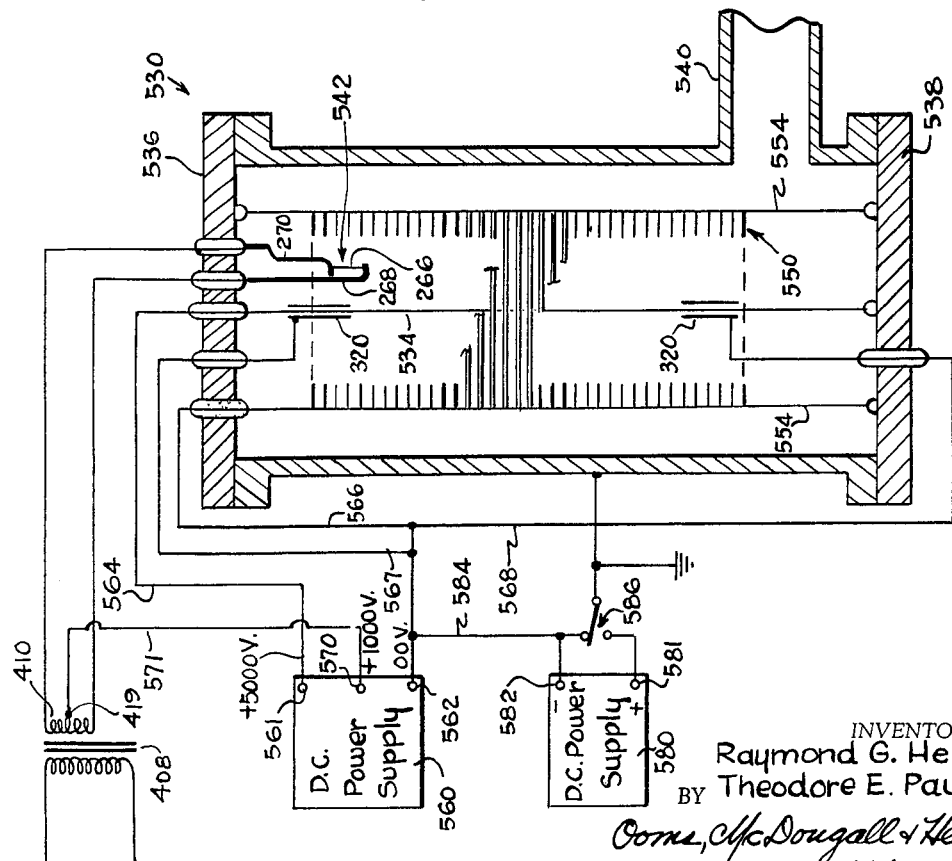
INVENTORS
Raymond G. Herb
BY Theodore E. Pauly
Ooms, McDougall & Herch
Attorneys

FIG. 29

INVENTORS
Raymond G. Herb
Theodore E. Pauly
BY Ooms, McDougall & Hersh
Attorneys

United States Patent Office 3,244,969
Patented Apr. 5, 1966

3,244,969
ELECTRON ORBITING TUBES FOR ION MEASUREMENT AND GETTERING PUMPS
Raymond G. Herb and Theodore E. Pauly, Madison, Wis., assignors to Wisconsin Alumni Research Foundation, Madison, Wis., a corporation of Wisconsin
Filed Dec. 20, 1963, Ser. No. 332,190
43 Claims. (Cl. 324—33)

This application is a continuation-in-part of the applicants' copending application Serial No. 261,104, filed February 26, 1963, and certain aspects of the subject matter disclosed in the present application are disclosed and claimed in said copending application.

This invention relates to electron orbiting devices and pertains particularly to devices which have important applications to ion gauges, electrometer tubes, amplifying devices and ion-getter vacuum pumps.

One object of the present invention is to provide a new and improved electronic device which is so arranged that the mean free path of the electrons may be much longer than the over-all size of the device, so that the probability that any electron will ionize a gas molecule in the device is greatly increased, the device thereby being adapted to serve as a highly efficient ion gauge, or as an ionizing device for an ion-getter vacuum pump.

A further object is to provide a new and improved electronic device of the foregoing character in which the mean free path of the electrons is increased by causing the electrons to travel in spiral paths or orbits, around one of the electrodes of the device, without utilizing any magnetic field.

A still further object is to provide a new and improved electron orbiting device of the foregoing character in which electrons are caused to move in spiral orbits in an electric field between an outer cylindrical electrode and an axial electrode in the form of a wire or cylinder received within the outer electrode.

Another object is to provide such a new and improved electron orbiting device in which electrons are injected or introduced into the space between the inner and outer electrodes with a substantial angular momentum so that electrons will travel in spiral orbits around the inner electrode.

A further object is to provide such a new and improved electron orbiting device in which the electrons may be injected by a heated filament disposed between the inner and outer electrodes and generally parallel to the inner electrode.

Another object is to provide such a new and improved electron orbiting device in which the proportion of electrons injected with high angular momentum is increased by providing an auxiliary electrode or shield to cooperate with the filament.

A further object is to provide a new and improved electron orbiting device in which a cylindrically symmetrical electric field is maintained in most of the space between the inner and outer electrodes so as to foster and maintain the orbiting of the electrons.

Another object is to provide such a new and improved electron orbiting device in which the length of the filament is made small compared with the length of the electrodes, so as to minimize the disturbing effect of the filament upon the cylindrical symmetry of the electric field between the electrodes.

A further object is to provide such a new and improved electron orbiting device in which a biasing voltage is applied to the filament so as to obtain the best orbiting action of the electrons.

Another object is to provide a new and improved electron orbiting device of the foregoing character which may include one or more reflector electrodes at or near either or both ends of the outer electrode for reflecting the spiraling electrons.

A further object is to provide a new and improved electron orbiting device of the foregoing character having a light shield between the filament and the outer electrode to avoid photoelectric emission of electrons from the outer electrode due to the light produced by the filament.

Another object is to provide a new and improved electron orbiting device of the foregoing character and having a collector electrode and a control electrode disposed between the filament and the collector electrode so that the discharge device may serve as an electrometer tube or an amplifying device.

A further object is to provide electron orbiting devices of the foregoing character which consume very little power and are extremely efficient.

Another object is to provide a new and improved electron orbiting device which will serve as an extremely sensitive ion gauge which generates a minimum of heat and generally causes very little disturbance in the vacuum system in which the ion gauge is employed.

A further object is to provide a new and improved electron orbiting device which will serve as an electrometer tube or amplifying device having unusually high gain.

Another object is to provide a new and improved electron orbiting device in the form of an ion-getter pump, in which the spiraling electrons are caused to bombard a target made of titanium, or some other getter, so as to heat the target sufficiently to produce titanium vapor, either by sublimation or vaporization, the titanium vapor being condensed on collector surfaces in the pump.

A further object is to provide such a new and improved ion-getter pump in which gas molecules are ionized in the pump by the orbiting electrons and are attracted to the collector surfaces, where the gas molecules are held or buried by the condensed titanium getter.

Another object is to provide such a new and improved pump in which the titanium target is in the form of a stack of washers or discs which are successively vaporized, the titanium being heated to a temperature at which the titanium sublimes, but below the melting point of the titanium.

Various other objects and advantages of the present invention will appear from the following description, taken with the accompanying drawings, in which:

FIG. 1 is a diagrammatic view, partly in perspective and partly in section, showing an electron orbiting device to be described as an illustrative embodiment of the present invention, such device being arranged to serve as an ion gauge or as an ionizing device for an ion-getter vacuum pump.

FIG. 2 is a central longitudinal sectional view taken through the device of FIG. 1.

FIG. 3 is an end view taken generally as indicated by the line 3—3 in FIG. 2.

FIG. 4 is a cross-sectional view, taken generally along the line 4—4 in FIG. 3.

FIG. 5 is a fragmentary enlarged elevational view illustrating the electron emitting filament and the associated shield wire as employed in the device of FIG. 1.

FIG. 6 is a view similar to FIG. 5, but illustrating a modified arrangement of the filament and shield wire.

FIG. 7 is a view similar to FIG. 2 but showing a modified construction having an additional reflector electrode and also the modified filament of FIG. 6.

FIG. 8 is a fragmentary view corresponding to the upper portion of FIG. 7 but illustrating a modified reflector electrode.

FIG. 9 is a diagrammatic cross-sectional view taken generally along the line 9—9 in FIG. 7, and showing possible orbits which may be traversed by some of the electrons.

FIG. 10 is a cross-sectional view, similar to FIG. 4, but illustrating a modified construction in which an electron gun provides the source of the electrons injected into the orbiting device.

FIG. 11 is a longitudinal sectional view showing a modified electron discharge device similar to that of FIG. 7, but including a light shield around the filament.

FIG. 12 is a longitudinal sectional view of a modified electron orbiting device provided with a collector electrode and a control electrode so as to serve as an electrometer tube or amplifying device.

FIG. 13 is a longitudinal sectional view showing a modified amplifying device adapted to be used at higher signal frequencies than the device of FIG. 12.

FIG. 14 is a diagrammatic perspective view of an ion gauge constituting another embodiment of the present invention.

FIG. 15 is a fragmentary enlarged horizontal section showing one of the insulating supports for the cylindrical electrodes employed in the device of FIG. 14, the view being taken generally along the line 15—15 in FIG. 16.

FIG. 16 is a fragmentary vertical section taken generally along the line 16—16 in FIG. 15.

FIG. 17 is a fragmentary enlarged longitudinal section showing the filament construction and the arrangement of one of the terminating electrodes, as employed in the device of FIG. 14.

FIGS. 18 and 19 are fragmentary vertical sections showing the upper and lower insulating supports for the central electrode of FIG. 14.

FIG. 20 is a diagrammatic elevational section of an ion-getter vacuum pump constituting another embodiment of the present invention.

FIG. 21 is a horizontal sectional view taken generally along the line 21—21 in FIG. 20.

FIG. 22 is a fragmentary enlarged vertical section showing the terminating electrode and taken generally along the line 22—22 in FIG. 20.

FIG. 23 is a diagrammatic longitudinal section showing a modified ion-getter vacuum pump.

Figure 26:
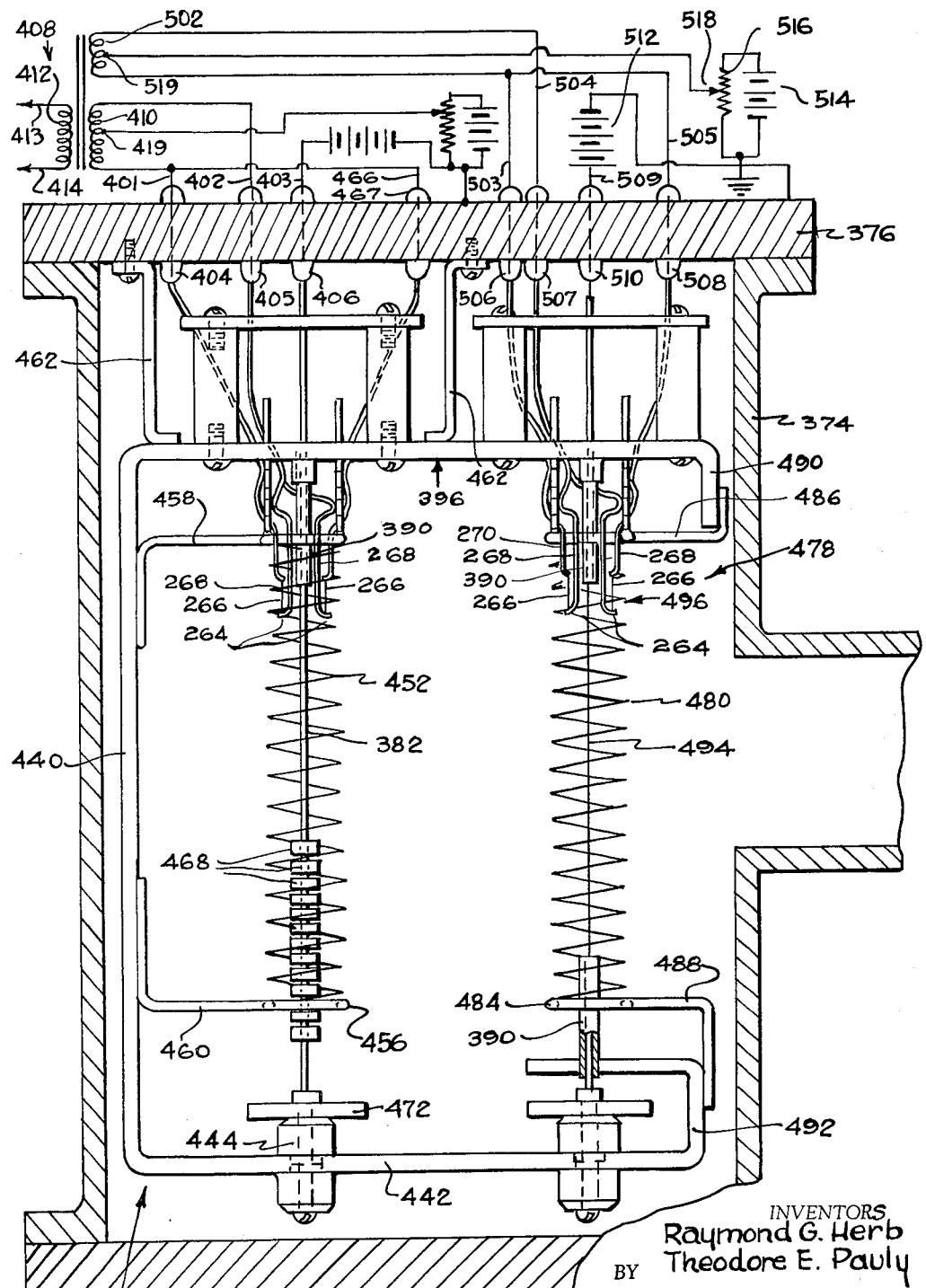

FIGS. 24 and 25 are fragmentary horizontal sections, taken generally along the lines 24—24 and 25—25 in FIG. 23.

FIGS. 26, 27, 28 and 29 are diagrammatic longitudinal sectional views showing four additional modified constructions of ion-getter vacuum pumps.

As already indicated, FIG. 1 illustrates an electron orbiting device 20 which is well adapted for use as an ion gauge in a vacuum chamber or system. Various ion gauges are already known for the purpose of giving an indication of the number of gas molecules in a vacuum system. In such ion gauges, electrons are caused to travel between two electrodes in the evacuated space. Some of the electrons will collide with gas molecules so as to ionize such molecules. The ionized gas molecules are then attracted to an ion collector electrode. The ion current is a measure of the concentration of the gas molecules in the vacuum system.

The electron orbiting device 20 of FIG. 1 has the important advantage that the electrons are caused to traverse spiral paths or orbits, in moving between the cathode and anode electrodes, so that the mean free path of the electrons is greatly lengthened. In this way, there is a much greater probability that each electron will ionize a gas molecule before passing to the anode. Thus, the electrons are utilized with greatly increased efficiency.

In the electron orbiting device 20 of FIG. 1, the electrons are caused to spiral in a cylindrically symmetrical electric field between an outer cylindrical electrode 22 and an inner or axial electrode 24. It will be seen that the outer electrode 22 has a cylindrical inner surface 26 which serves as the boundary of a cylindrical space 28 through which the electrons move. The illustrated outer electrode 22 is in the form of a thin-walled cylindrical metal tube, but it will be understood that the shape of the outside of the electrode 22 is of no particular concern and may be changed as may be desired or convenient.

The inner electrode 24 extends along the axis of the cylindrical surface 26 and is received within the outer electrode 22. The inner electrode 24 has a cylindrical outer surface 30. In this case, the inner electrode 24 is in the form of a cylindrical metal wire or rod, but it will be understood that the inner electrode may be hollow and tubular in form without affecting the operation of the electron orbiting device.

A cylindrically symmetrical electric field is produced in the space between the outer and inner electrodes 22 and 24 by impressing a voltage between such electrodes. Normally, the inner electrode 24 is positively charged so as to attract electrons. The outer electrode 22 is negatively charged so as to attract positively ionized gas molecules. The operating voltage may be derived from any suitable source of direct potential, such as a battery 32. It will be seen that a lead 34 is connected between the positive terminal of the battery 32 and the axial electrode 24. The negative terminal of the battery 32 may be grounded. In this case, a meter 36 for measuring the ion current is connected between the outer electrode 22 and ground. Thus, the negative terminal of the battery 32 is connected to the outer electrode 22 by way of the ground connections and the meter 36.

Electrons are injected into the space 28 between the outer and inner electrodes 22 and 24 in such a manner that some or all of the electrons will have sufficient angular momentum to travel in orbital paths around the positively charged central electrode 24. In this case, the electrons are enabled to traverse extremely long paths before finally being captured by the positively charged electrode or anode 24. Most of the orbiting electrons will travel in spiral paths which will not necessarily be circular.

Various electron injecting devices may be employed to introduce the electrons into the space between the concentric cylindrical electrodes 22 and 24. FIG. 1 illustrates a particularly simple yet effective electron injecting device 38 comprising a small narrow hairpin-shaped filament 40 disposed between the electrodes 22 and 24, near one end of the outer electrode 22. The illustrated filament 40 has parallel legs 42 and 44 which extend substantially parallel to the axial electrode 24. The axes of the legs 42 and 44 are in a single radial plane which also includes the axis of the central electrode 24. The filament 40 may be in the form of a fine wire made of tungsten or other suitable metal. An electric current may be passed through the filament 40 to heat the filament so that it will emit electrons. To supply the filament 40 with current, the ends of the filament are connected to heavier lead-in wires 46 and 48 which also serve as supports for the filament. The lead-in wires 46 and 48 may be brought into the space 28 through openings in an insulating rod or member 50 which may be made of ceramic material or the like.

Current for heating the filament 40 may be derived from any suitable source, such as a low voltage secondary winding 52 of a transformer 54. The primary winding 56 of the transformer 54 may be connected to an ordinary commercial source of alternating current at 110 volts and 60 cycles, or any other suitable voltage and frequency.

The filament 40 is preferably given a positive bias relative to the outer electrode 22. In this way, the electrons emitted from the filament 40 will not be able to reach the outer electrode 22. The biasing voltage also minimizes the disturbing effect of the filament upon the cylindrically symmetrical electric field produced between the outer and inner cylindrical electrodes 22 and 24. Such biasing voltage may be derived from any suitable source, such as a battery 58. In this case, a variable potentiometer is connected to the center tap 64 of the secondary winding 52 so that the biasing voltage on the filament may be varied by adjusting the potentiometer 60.

Most of the electrons will be emitted from the filament 40 in directions other than a radially inward direction and thus will acquire substantial angular momentum, due to the electric field around the filament. Although the emitted electrons will be attracted by the positively charged axial electrode 24, many of the electrons will avoid immediate capture by the axial electrode by traveling in spiral paths or orbits around the axial electrode. The electrons may avoid capture for many revolutions so that the mean free path of the electrons may be many times the greatest over-all dimension of the electron orbiting device.

A shield electrode 66 may be provided between the electron injecting filament 40 and the central electrode 24 to prevent direct radial movement of electrons between the filament and the positively charged central electrode. As shown, the shield electrode 66 is in the form of a rod or wire which is parallel to the central rod 24 and the filament wires 42 and 44. The axis of the illustrated shield wire 66 is in the same radial plane as the axes of the legs 42 and 44 of the filament 40. The shield wire 66 may be mounted on and connected to the inner lead wire 46. Thus, the shield wire 66 is at substantially the same biasing voltage as the filament 40. The electric field around the filament 40 is modified by the shield wire 66 so that greater angular momentum may be imparted to the electrons emitted by the filament. It has been found, however, that the shield wire 66 is not strictly necessary and that electrons can be caused to orbit in spiral paths around the central electrode 24, even if the shield wire is omitted entirely.

In this case, the electron orbiting device 20 is also provided with a reflector plate or electrode 68 which is opposite one end of the cylindrical outer electrode 26. The reflector electrode 68 is circular in shape and corresponds generally in diameter to the cylindrical electrode 22. As shown, the reflector electrode 68 is in the form of a flat circular disk disposed perpendicular to the axis of the cylindrical electrode 22. The central electrode 24 passes through a central opening 70 in the reflector electrode 68. Another opening 72 is formed in the reflector electrode 68 to pass the lead-in wires 46 and 48 and the insulating support 50 for the filament 40.

The reflector electrode 68 is preferably given a negative bias, relative to the outer electrode 26 so as to repel the electrons and cause them to spiral around the central electrode 24. Such bias may be derived from any suitable source, such as a battery 74. A potentiometer 76 may be connected across the battery 74. The slider 78 of the potentiometer is connected to the reflector electrode 68 by a lead 80. The positive terminal of the battery 74 is grounded. By adjusting the potentiometer 76, the bias voltage on the reflector electrode 68 may be varied.

It will be evident from FIG. 5 that the shield wire 66 is offset in a radially inward direction from the lead-in wire 46. FIG. 6 illustrates a modified electron injector 84 comprising a shield wire 86 which constitutes a linear extension of the lead-in wire 46. The construction of FIG. 6 employs a modified electron emitting filament 88 which is L-shaped. The filament 88 has an elongated leg 90 extending parallel to the shield wire 86. One end of the leg 90 is connected to the end of the lead-in wire 48. A shorter leg 92 extends between the other end of the leg 90 and the shield wire 86. Here again, the filament 88 may be made of fine tungsten wire.

The filament 88 is kept small so as to minimize the disturbance produced by the filament in the cylindrically symmetrical electric field between the outer and inner cylindrical electrodes 22 and 24. In particular, the length of the filament is preferably kept small compared with the length of the outer cylinder 22. Moreover, the filament is preferably located at or near one end of the space between the outer and inner cylindrical electrodes 22 and 24 so that most of such space will constitute a region in which the electric field is cylindrically symmetrical and undisturbed.

The electron orbiting device 20 provides a highly efficient ion gauge. With this gauge, electron mean free paths greater than 1,000 centimeters have been achieved, even though the maximum dimension of the gauge was only a few centimeters. Moreover, the gauge has yielded a positive ion current five times greater than an available ion gauge of the Bayard-Alpert type, even though the power consumption and electron emission of the present gauge was much less than that of the available gauge.

The electron orbiting device 20 may also serve as an efficient ionizing device for an ion-getter vacuum pump, in which the gas ions produced by the ionizing device are absorbed by a getter material. Normally, the getter is supplied by a getter evaporating or sputtering device.

FIG. 7 illustrates a modified electron orbiting device 100 which for the most part is the same as the orbiting device 20 of FIG. 1. Corresponding components shown in FIG. 7 are given the same reference characters as in FIG. 1. Only the differences between electron orbiting devices 20 and 100 need be described in detail.

It will be seen that the orbiting device 100 employs the modified electron injector 84 of FIG. 6. The shield wire 86 is disposed between the filament 88 and the axial electrode 24. The axis of the central electrode 24, the shield wire 86 and the filament 88 are in substantially the same plane.

Moreover, the electron orbiting device 100 is provided with an additional reflector electrode 102 which is similar to the electrode 68 but is disposed opposite the other end of the outer cylindrical electrode 22. The electrode 102 is in the form of a flat circular disk having an opening 104 therein through which the central electrode 24 extends. The reflector electrode is preferably given a small negative bias voltage relative to the outer electrode 22. Such bias voltage may be derived from any suitable source, such as a battery 106 having its positive terminal grounded. A potentiometer 108 is connected across the battery 106. The slider 110 of the potentiometer may be connected to the electrode 102.

The electrode 102 has the effect of reflecting the spiraling electrons so that they tend to spiral in the opposite axial direction along the central electrode 24. On the other hand, the end of the outer electrode 22 of FIG. 1 is left open. It will be understood that the extra reflector electrode 102 is not strictly necessary. Long mean free paths have been obtained with the open-ended construction of FIG. 1. Like the device 20 of FIG. 1, the electron orbiting device 100 of FIG. 7 is well adapted for use as an ion gauge to measure the vacuum in a vacuum system or chamber.

FIG. 8 illustrates another modified electron orbiting device 120 which is the same as the device 100 of FIG. 7 except that the electrode 102 is replaced with a reflector electrode 122 having a much larger central opening 124 therein, so that the electrode 122 is in the form of a flat ring. It has been found that the electrode construction of FIG. 8 usually results in longer mean free paths than the construction of FIG. 7.

In the electron devices of FIGS. 1–8, the electrons travel in spiral orbits around the central electrode 24. However, the orbits are not necessarily circular and in most cases will probably be noncircular. FIG. 9 indicates one type of noncircular orbit which may be traversed by some of the electrons. It will be seen that the electrons pass close to the central electrode 24 and then travel outwardly, close to the outer electrode 22 before again turning inwardly. Orbits of this type and other noncircular orbits are usually more advantageous than circular orbits because the electron may travel through several revolutions before coming close to the electron injecting filament. A few of the electrons may be recaptured by the filament. Such recapture shortens the mean free path of the electrons. Moreover, the electric field around the filament disturbs the orbits of the electrons. Some of the orbits may be improved, but other orbits will be modified so that the electrons will pass more quickly to the central electrode. Thus, the disturbing effect of the filament generally tends to shorten the mean free path of the electrons. As the electrons spiral away from the filament, the disturbing effect of the filament is diminished.

A mathematical analysis of the movement of electrons between the inner and outer cylindrical electrodes will provide guides as to the location of the filament and the bias to be applied to the filament. In view of the cylindrical configuration of the inner and outer electrodes, the potential at any radius $\rho$ is given by the following equation:

$$\Phi = \frac{V \ln\left(\frac{R}{\rho}\right)}{\ln\left(\frac{R}{r}\right)} \quad (1)$$

In this formula, $\Phi$ is the potential at the radius $\rho$; $V$ is the voltage between the inner and outer cylinders; $R$ is the radius of the outer cylinder; and $r$ is the radius of the inner cylinder.

The electric field $E$ between the cylinders is given by the following equation:

$$E = \frac{d\Phi}{d\rho} = \frac{V}{\ln\left(\frac{R}{r}\right)} \cdot \frac{1}{\rho} \quad (2)$$

Although most of the electron orbits are probably non-circular, it will simplify the mathematical analysis to consider the case of circular orbits. The kinetic energy of an electron moving in a stable circular orbit of radius $\rho_f$ is given by the following equation:

$$\tfrac{1}{2} mv^2 = e[\Phi(\rho_f) - bV] \quad (3)$$

In this equation $bV$ is the filament bias, and $b$ is a number which is usually between zero and 0.1. For stability in a circular orbit, it is necessary to balance centrifugal force against the electric force, in accordance with the following equation:

$$\frac{mv^2}{\rho} = Ee = \frac{eV}{\ln\left(\frac{R}{r}\right)} \cdot \frac{1}{\rho} \quad (4)$$

Equation No. 4 may be solved for the kinetic energy, giving the following equation:

$$\tfrac{1}{2} mv^2 = \frac{eV}{2 \ln\left(\frac{R}{r}\right)} \quad (5)$$

This formula indicates that the kinetic energy for stability in a circular orbit is independent of the radius $\rho$. If an electron from the filament is to have a circular orbit of the radius $\rho_f$, the filament must be located at such radius. In view of this fact, Equations No. 3 and No. 5 may be combined to give the following equation:

$$\frac{eV}{2 \ln\left(\frac{R}{r}\right)} = e\Phi(\rho_f) - ebV \quad (6)$$

The potential given by Equation No. 1 may be substituted in Equation No. 6 to give the following equation:

$$\frac{eV}{2 \ln\left(\frac{R}{r}\right)} = \frac{eV \ln\left(\frac{R}{\rho_f}\right)}{\ln\left(\frac{R}{r}\right)} - ebV \quad (7)$$

This equation may advantageously be simplified by multiplying both sides by $$\ln\left(\frac{R}{r}\right)$$

to obtain the following equation:

$$\ln\left(\frac{R}{\rho_f}\right) = 0.5 + b \ln\left(\frac{R}{r}\right) \quad (8)$$

Equation No. 8 provides guides with regard to filament location and the biasing voltage on the filament to make a circular orbit possible.

The following table gives filament positions for various values of filament bias, for two different values of $R/r$. The values given in the table are such as to make a circular orbit possible. However, these values are not necessarily the best values.

| $\frac{R}{r}=8 \ln\left(\frac{R}{r}\right)=2.07$ | | $R=16 \ln\left(\frac{R}{r}\right)=2.77$ | |
|---|---|---|---|
| $b \ln\left(\frac{R}{\rho_f}\right)$ | $\rho_f/R$ | $b \ln\left(\frac{R}{\rho_f}\right)$ | $\rho_f/R$ |
| 0.1 | 0.7 | 0.498 | 0.1 | 0.777 | 0.461 |
| 0.05 | 0.6 | 0.55 | 0.05 | 0.638 | 0.528 |
| 0.025 | 0.55 | 0.578 | 0.025 | 0.569 | 0.565 |
| 0.01 | 0.52 | 0.595 | 0.01 | 0.527 | 0.593 |
| 0.00 | 0.5 | 0.604 | 0.00 | 0.500 | 0.604 |

FIG. 10 comprises a diagrammatic illustration of another modified electron orbiting device 130 in which the electrons are injected into the space 28 between the outer and inner electrodes 22 and 24 by an electron gun 132 which gives the electrons suffifficient angular momentum so that they spiral around the central electrode 24. The electron gun 132 may be either inside or outside the vacuum chamber in which the electrodes 22 and 24 are situated. Electron guns are well known so that it will not be necessary to describe the construction of any particular electron gun. As shown in FIG. 10, the electron gun 132 propels the electrons into the space 28 through an opening 134 in the outer cylindrical electrode 22, preferably near one end thereof. However, it will be understood that such an opening is not strictly necessary inasmuch as the electron gun may be aimed so as to propel the electrons into the space 28 through the open end of the cylindrical electrode 22. The electron gun is outside the space 28 between the outer and inner cylindrical electrodes 22 and 24 and thus does not appreciably disturb the cylindrical symmetry of the electric field in such space. Thus, the orbits of the electrons are fostered and maintained by the symmetrical field.

FIG. 11 illustrates another modified electron orbiting device 140 which employs the same electron injector 84 as illustrated in FIG. 6. The orbiting device 140 has an outer electrode 144 with an internal cylindrical surface 146. An axial cylindrical rod or wire 148 forms the inner electrode. Thus, the electron orbiting device 140 is similar to the device 100 of FIG. 7. However, the orbiting device 140 is provided with a light shield 150 which is disposed between the electron emitting filament 88 and the outer electrode 144 so as to minimize the photoelectric emission of electrons from the outer electrode 144 due to light from the filament 88. The illustrated light shield 150 is in the form of a cylindrical tubular electrode having a diameter less than that of the internal cylinder 146 but substantially greater than that of the axial rod electrode 148. The cylindrical shield 150 is received within the outer electrode 144 and around the central electrode 148. The shield electrode 150 may be connected to ground, so that it will be at the same potential as the grounded outer electrode 144. It will be understood, however, that a biasing voltage may be applied to the shield electrode 150, if desired. At the end adjacent the filament 88, the shield electrode 150 is stepped inwardly to form a shoulder 152 and a reduced internal cylindrical bore or surface 154. The filament 88 projects into the electron discharge device through the reduced bore 154. The ceramic tube 50, as illustrated in FIGS. 1–7, may be employed to insulate the lead-in wires for the filament 88 and may be disposed within the bore 154. It will be understood that the form of the insulator may be varied as desired. As in the case of the embodiments of FIGS. 1–9, the central electrode 148 may be supplied with a positive voltage, with respect to the outer electrode 144. The voltage may be derived from any suitable source such as the battery 32, corresponding to that of FIG. 1. The meter 36, for measuring the ion current, may also be connected between the outer electrode 144 and ground, as in the arrangement of FIG. 1. The reflecting electrode 122 of FIG. 8 may be mounted opposite the end of the outer electrode 144, remote from the filament 88.

Some or most of the electrons from the filament 88 go into spiral orbits around the central electrode 148. The electrons spiral along the inside of the shield electrode 150 and then pass out of the shield electrode into the space between the outer electrode 144 and the central electrode 148. In this case, the shield electrode 150 is substantially shorter than the outer electrode 144 so that the shield electrode extends only part way along the outer electrode.

Inasmuch as the filament 88 is heated to an electron emitting temperature, the filament also gives off light. If the light is allowed to fall directly upon the outer electrode 144, the light causes photoelectric emission of electrons from the outer electrode. Such emission produces a current through the meter 36. Such current is combined with and tends to obscure the ion current produced by the movement of positively charged gas ions to the outer electrode 144. However, in the embodiment of FIG. 11, the shield electrode 150 prevents the light from the filament 88 from falling directly upon the outer electrode 144. The light from the filament 88 must be reflected several times within the light shield 150 before the light can reach the outer electrode 144. Of course, these reflections greatly reduce the amount of light which reaches the outer electrode from the filament. Thus, the photoelectric emission of electrons by the outer electrode is greatly reduced so that it becomes a virtually negligible factor. The provision of the light shield 150 increases the sensitivity and accuracy of the electron discharge device 140, particularly when employed as an ion guage.

The electron orbiting devices illustrated thus far are particularly useful as ion guages to measure the concentration of gas molecules in a vacuum chamber or system. The orbiting devices are also useful for ionizing gas materials in ion-getter vacuum pumps. With suitable modifications, the electron orbiting devices of the present invention will have many other applications. Thus, FIG. 12 illustrates a modified electron orbiting device 160 which is arranged to provide an electrometer amplifying tube. The device may also be employed in connection with many other applications in which amplification is desired.

The electron orbiting device 160 is quite similar to the devices already described in that it comprises an outer electrode 162 having an internal cylindrical surface 164 within which a cylindrical inner electrode 166 is received. As before, the inner electrode 166 may be in the form of a cylindrical wire or rod extending along the axis of the internal cylinder 164. The electrodes 162 and 166 are mounted within a housing or enclosure 168 in which a vacuum is maintained. As before, a positive voltage is applied between the inner electrode 166 and the outer electrode 162. Such voltage may be derived from a battery 170 or any other suitable source. It has been found that a positive voltage of 200 volts is suitable, but the voltage may be varied over a wide range.

The electron orbiting device 160 may employ the same electron injector 84 as illustrated in FIG. 6. A current to heat the filament 88 may be derived from any suitable source such as a battery 172. The filament 88 and the shield wire 86 may be given a positive bias derived from a battery 174 or any other suitable source. The reflector electrode 68 of FIG. 1 may also be employed and may be given a biasing voltage derived from a battery 176 or some other suitable source. In some cases, the voltage on the reflector 68 may be the same as the voltage on the outer electrode 162, in which case the reflector 68 is merely grounded.

As before, electrons from the filament 88 go into spiral orbits around the central electrode 166. The spiraling electrons travel along the space between the electrodes 162 and 164 and eventually pass out of the outer electrode 162 at the end thereof remote from the filament 88. In this case, a collector electrode 180 is disposed adjacent the remote end of the outer electrode 162. Such electrode is adapted to collect the spiraling electrons which pass out of the outer electrode 162. A positive voltage may be applied to the collector electrode so that the electrons will be attracted to such electrode. The positive voltage may be derived from the battery 170 or any other suitable source. A meter 182 or any other suitable output device may be connected in circuit with the collector electrode 180. The meter 182 is adapted to measure the current to the collector electrode 180.

As illustrated, the collector electrode 180 is in the form of a flat circular disk disposed opposite the end of the outer electrode 162 and generally perpendicular to the axis of the inner electrode 166. The inner electrode 166 may pass through a central opening 184 in the collector electrode 180.

At a point disposed between the electron emitting filament 88 and the collector electrode 180, the electron orbiting device 160 is provided with a control electrode 186 which regulates the passage of the electrons to the collector electrode. As shown, the control electrode 186 comprises a wire formed into an annular shape and mounted coaxially around the inner electrode 186 and within the outer electrode 162. A lead-in wire 188 extends to the control electrode 186 through an opening 190 in the outer electrode 162. The voltage or signal to be measured or amplified is applied across input terminals 192 and 194. The input terminal 192 is connected to the control electrode 186 while the terminal 194 is grounded.

It has been found that the electron orbiting device 160 of FIG. 12 provides a sensitive amplifying device. Thus, any change in the voltage on the control electrode 186 changes the current to the collector electrode 180. Moreover, it has been found that the input impedance between the control electrode 186 and ground is extremely high, inasmuch as the control electrode draws substantially no current, particularly when the control electrode is maintained at a negative potential relative to the filament 88. By means of a suitable battery 196, the control electrode 186 may be biased negatively relative to the grounded outer electrode 162 but it is normally sufficient to return the input circuit to ground so that the control electrode 186 is maintained at the same bias potential as the outer electrode 162. It has been found that the input impedance of the electron orbiting device 160 is at least as high as that of other available electrometer tubes. Moreover, the electron discharge device 160 of the present invention gives a considerably higher gain than other available electrometer tubes. The higher gain is a distinct advantage, whether the tube is employed as an electrometer tube or for other amplifying purposes.

FIG. 13 illustrates another modified amplifying tube 200 intended particularly for amplifying signals at ultra-high frequencies. Here again, the device is mounted within a housing or envelope 202 in which a vacuum is maintained. In this case, the device 200 comprises an outer electrode 204 which may be in the form of a metal block or body through which a cylindrical bore 206 has been formed. The device 200 comprises an inner electrode 208 in the form of a cylindrical wire or rod extending axially within the bore 206. To provide for efficient use at ultrahigh frequencies, the bore 206 may be of small size, such as $\frac{1}{16}$ of an inch. The outer electrode 204 may be grounded. A positive voltage of 200 volts, or some other suitable voltage, may be applied between the axial electrode 208 and ground. Thus, the central electrode 208 is connected to a positive terminal 210 to which the power supply is connected. The negative power supply terminal 212 is grounded.

In this case, electrons are injected into the space between the outer and inner electrodes 204 and 208 by means of an electron emitting filament 214 disposed in such space. As shown, the filament 214 comprises a fine wire, made of tungsten or some other suitable material. One end of the filament wire 214 may be welded or otherwise secured to the outer electrode 204, the weld being indicated at 216. The filament 214 extends generally in the same direction as the inner electrode 208 but the filament angles inwardly toward the inner electrode from the weld point 216 at which the filament is secured to the outer electrode 204. The other end of the filament 214 is connected to a support in the form of a heavier lead-in wire 218. The filament 214 may be heated to an electron emitting temperature by passing current through the filament. Thus, the lead-in wire 218 may be connected to a power supply terminal 220, the other power supply terminal 222 being grounded.

As before, some of the electrons emitted by the filament 214 go into spiral orbits around the central electrode 208. It will be seen that the central electrode 208 extends out of the cylindrical bore 206 beyond the right-hand end of the outer electrode 204, as shown in FIG. 13. Some of the spiraling electrons pass out of the bore 206 and continue to spiral around the central electrode 208. A collector electrode 226 is disposed to the right of the outer electrode 204 and adjacent the central electrode 208. Thus, the collector electrode is spaced from the filament 214. At a point closer to the end of the outer electrode 204, the discharge device 200 is provided with a control electrode 228 which is illustrated as a ring disposed around the central electrode 208 and spaced from the outer electrode 204. The illustrated control electrode 228 is cylindrical in form and has an inner diameter corresponding to that of the bore 206 in the outer electrode 204. The current to the collector electrode 226 may be varied by changing the voltage on the control electrode 228. Thus, the signal to be amplified is applied between the control electrode 228 and the grounded outer electrode 204. Accordingly, FIG. 13 illustrates input terminals 230 and 232 connected to the control electrode 228 and to the outer electrode 204, respectively.

A positive voltage is applied to the collector electrode 226 so that it will attract electrons. Thus, the collector electrode 226 is connected to a positive power supply terminal 236 through an output device 238. The negative power supply terminal 240 is grounded.

Due to the small size of the electron orbiting device 200 of FIG. 13, the device functions efficiently as an amplifier at ultrahigh frequencies. The coaxial arrangement of the electron orbiting device also contributes to the efficiency and utility of the device at ultrahigh frequencies.

It will be apparent that the electron orbiting devices of the present invention have many advantages and applications. Thus, for example, they find important applications as ion gauges, ionizing devices for ion-getter vacuum pumps, electrometer tubes and high frequency amplifying devices. An important factor in the operation of the electron orbiting devices is the manner in which the electrons are caused to move in spiral orbits between the cylindrical electrodes. Such orbital movement of the electrons is achieved without providing any magnetic field to deflect the electrons. The orbital movement of the electrons is caused by the character of the electric field between the electrodes and the manner in which the electrons are injected into the space between the electrodes.

FIG. 14 illustrates an ion gauge 250 constituting another illustrative embodiment of the present invention. As shown, the ion gauge 250 is provided with an envelope or housing 252 which may be made of glass or any suitable material. The envelope 252 is provided with a side tube 254 which may be connected to the vacuum system with which the ion gauge is to be used.

As in the case of the previous embodiments, the ion gauge 250 is provided with an elongated central or axial electrode 256 which is cylindrical in shape. However, in this case, the axial electrode 256 preferably takes the form of an extremely fine wire, so as to minimize the possibility that electrons will strike the wire. In this way, the mean free path of the electrons is increased.

In this case, the outer cylindrical electrode is divided into two parts in the form of coaxial metal cylinders 258 and 260, arranged end to end with a space 262 therebetween. The central electrode 256 extends axially through both cylinders 258 and 260.

The ion gauge 250 employs an electron injecting device 264 which is similar to that illustrated in FIGS. 6 and 7. As shown to advantage in FIGS. 14 and 17, the electron injecting device 264 comprises a filament 266 in the form of a fine wire supported by two heavier wires 268 and 270. The filament 266 is parallel to the central electrode 256 and is spaced between the central electrode and the lower cylinder 258 adjacent to the lower end thereof. The filament 266 corresponds to the filament 90 of FIG. 6, while the supporting wire 268 corresponds to the wire 86. Thus, the supporting wire 268 is substantially parallel to the filament 266 and is positioned between the filament and the central electrode 256. Thus, the wire 268 acts as a shield or deflector to prevent electrons from traveling directly inwardly from the filament 266 to the central electrode 256. In this way, the shield wire 268 increases the probability that the electrons emitted by the filament 266 will go into spiral orbits around the central wire 256. As shown, the supporting wire 268 has an upper end portion 272 which curves outwardly through approximately one-quarter of a circle. The upper end of the filament wire 266 is welded or otherwise secured to the outer end of the curved portion 272. The other supporting wire 270 has an inwardly curving upper end portion 274 to which the lower end of the filament wire is welded or otherwise secured. The filament wire 266 is preferably made of tungsten so that it will withstand high operating temperatures.

In this case, the lower ends of the supporting wires 268 and 270 are welded or otherwise secured to metal collars 276 and 278 which are securely mounted on the outside of a supporting rod 280 made of a ceramic or other insulating material.

The outer cylindrical electrodes 258 and 260 are insulated from each other and also from the central electrode 256. In this case, the cylinders 258 and 260 are supported by a generally rectangular frame 284 made of wire or the like. It will be seen that the frame 284 has a pair of spaced elongated upright members 286, as well as upper and lower cross members 288 and 290 which extend between the members 286. As shown, the cylinders 258 and 260 are connected to the upright members 286 of the wire frame 284 by means of a plurality of insulating beads 292, made of glass, ceramic or other suitable insulating material. As shown to good advantage in FIGS. 15 and 16, each bead 292 is formed with two parallel bores or openings 294 and 296. A wire 298 is inserted through the opening 296 and is wrapped around one of the frame wires 286. Another wire 300 is inserted through the opening 294 and is welded or otherwise secured to one of the cylinders 258 and 260. As shown in FIG. 14, each of the cylinders 258 and 260 is supported by four of the insulating beads 292, two of the beads being connected to each supporting wire 286.

The upper end of the central wire 256 may be tied or wrapped around an insulating sleeve or bead 304 which is mounted on an upwardly offset central portion 306 of the upper cross-wire 288. The lower end of the central wire 256 is connected to the upper portion of a wire 308 which is formed into a spring 310, adapted to maintain tension on the central wire 256. It will be seen that the lower end of the spring wire 308 is tied or wrapped around an insulating bead or sleeve 312 mounted on the lower cross-wire 290.

As in the previous embodiments, the filament 266 is heated electrically so that it will emit electrons. Most of the emitted electrons have sufficient angular momentum to carry them into spiral orbits around the positively charged central wire 256. The electrons spiral upwardly around the wire 256 through both of the outer cylinders 258 and 260. Eventually, most of the electrons will strike gas molecules which will thus become ionized and will be attracted to the negatively charged outer cylinders 258 and 260. The ion current to the upper cylinder 260 is taken as a measure of the number of gas molecules in the vacuum system. Further details of the operation of the device will be described presently.

The ion gauge 250 of FIG. 14 is provided with improved means for reflecting the upwardly spiraling electrons when they reach the upper end of the upper cylinder 260. Such reflecting means cause the electrons to spiral downwardly through the cylinders 260 and 258, around the central wire 256. Similar reflecting means are provided at the lower end of the lower cylinder 258 to cause the downwardly spiraling electrons to be reflected upwardly. In this way, the electrons are prevented from passing out of the open ends of the cylinders 258 and 260, so that the electrons will traverse a great many orbits before finally being captured by the central wire 256. In this way, the mean free path of the electrons is increased so that the electrons will have a greater opportunity for ionizing gas molecules.

Such reflecting means preferably take the form of upper and lower cylindrical terminating electrodes 320 which are mounted around the central wire 256, coaxially therewith. The terminating electrodes 320 are insulated from the central wire 256 and are positioned at the upper end of the upper cylinder 260 and the lower end of the lower cylinder 258. Preferably, the electrodes 320 project slightly into the cylinders 258 and 260. To avoid any possible contact between the central wire 256 and the terminating electrodes 320, each terminating electrode is preferably provided with a cylindrical bushing 322 mounted therein and made of ceramic or other insulating material. It will be seen that the cylindrical terminating electrodes 320 are spaced rather closely to the central wire 256. Thus, the diameter of the terminating electrode 320 is considerably smaller than the inside diameter of the outer cylinders 258 and 260. The terminating electrodes 320 are preferably maintained at the same or approximately the same potential as the negatively charged outer cylinders 258 and 260. Thus, a strong electric field will be produced between the positively charged central wire 256 and the end of each of the negatively charged terminating electrodes 320. This strong electric field is responsible for reflecting the spiraling electrons so that the electrons are kept in their orbits within the cylinders 258 and 260.

The upper terminating or reflecting electrode 320 may be mounted on a metal disc 326 which is welded or otherwise secured to the upper cross-wire 288. The lower terminating electrode 320 could be similarly mounted, but preferably is supported by the central wire 256. As shown to advantage in FIG. 17, the upper end of the spring wire 308 may be coiled back on itself to form a coil spring 328 which is snugly received within the ceramic bushing 322. The lower end of the central wire 256 is welded or tied onto the uppermost convolution of the coil spring 328, in such a manner that the wire 256 is centered within the electrode 320. The coil spring 328 may be wound to an initial diameter which is somewhat greater than the inside diameter of the bushing 322, so that the coil spring 328 will grip the inside of the bushing when the coil spring is stretched, inserted into the bushing, and released.

The ceramic rod 280 which supports the filament 266 may be mounted on a metal disc 322 which is connected to the main supporting wires 286 by a pair of wires 334. A metal rod or sleeve 336 is mounted on the disc 332 and is formed with a bore or socket 338 for receiving the lower end of the ceramic rod 280.

A series of leads 341–345 may be sealed or pressed into a stem 346 formed on the glass envelope 252. The leads 341 and 342 are connected to the collars 276 and 278 to which the opposite ends of the filament 266 are connected. The lead 343 is connected to the spring wire 308 which in turn is connected to the central electrode wire 256. The lead 344 is connected to the lower terminating electrode 320 and also to the supporting frame 284, which affords a connection to the upper terminating electrode 320. It will be seen that the lead 345 is connected to the lower cylinder 258. A connection to the upper cylinder 260 is provided by a lead 347 which extends through a seal in the side of the glass envelope 252.

The electrical circuit for operating the ion gauge 250 may be substantially the same as in the case of the previous embodiments. Thus, power for heating the filament 266 may be derived from a transformer 350 having a secondary winding 352 connected to the leads 341 and 342. The primary 354 of the transformer 350 is connected to a suitable source of alternating current, represented by power lines 355 and 356.

A direct current power supply, shown as a battery 358, provides the voltage between the central wire 256 and the cylinders 258 and 260. The positive terminal of the battery 358 is connected to the lead 343, while the negative terminal is grounded and is also connected to the lead 345. A sensitive galvanometer 360, or some other current measuring device, is connected between the lead 347 from the upper cylinder 260 and the negative terminal of the battery 358. The meter 360 is adapted to indicate the ion current to the cylinder 260.

Another direct current power supply or battery 362 may be provided to bias the filament 266 to a positive potential. As shown, a potentiometer 364 is connected across the battery 362. The movable contact 366 of the potentiometer is connected to center tap 368 on the secondary winding 352. The negative terminal of the battery 362 is grounded and thus is connected to the outer cylinders 258 and 260.

As shown, a biasing battery 370 is connected between the lead 344 and ground so as to provide a small biasing voltage on the terminating electrodes 320. In many cases, this biasing voltage is not needed, in which case the battery 370 may be omitted, and the lead 344 may be directly grounded.

As already indicated, the electrons emitted by the filament 266 travel in spiral orbits around the central wire 256. The localized electric fields caused by the upper and lower terminating electrodes 320 reflect the spiraling electrons so as to keep them confined within the cylinders 258 and 260. Eventually, most of the electrons collide with gas molecules and thereby cause the molecules to become positively ionized. The positive gas ions are attracted to the outer cylinders 258 and 260.

Thus, ion currents are produced to both of the cylinders 258 and 260. However, only the ion current to the upper cylinder 260 is measured by the meter 360. The lower cylinder 258 is relatively close to the filament 266 and thus receives considerable light therefrom. Such light produces a certain amount of photoelectric emission of electrons from the cylinder 258. Such emission produces a small current which is superimposed upon the ion current to the lower cylinder 258 and makes it difficult to obtain an accurate reading of the ion current.

On the other hand, the upper cylinder 260 is relatively remote from the filament 266 so that very little light from the filament falls upon the cylinder 260. Thus, the photoelectric current to the cylinder 260 is minimized so that the ion current may be measured with greater accuracy.

Some X-rays are also generated when electrons strike the central wire 256. These X-rays strike the inside of the cylinder 258 and also produce photoelectric emission of electrons. The production of X-rays is concentrated primarily along the portion of the central wire 256 which is near the filament 266. Thus, the remoteness of the upper cylinder 260 from the filament minimizes the amount of photoelectric emission from the upper cylinder due to X-rays.

The central wire 256 and the coaxial cylinders 258 and 260 provide a cylindrically symmetric electric field within the entire upper cylinder 260 and the upper portion of the lower cylinder 258. The filament 266 and the supports for the filament may introduce small irregularities in the electric field in the lower portion of the cylinder 258. However, these irregularities may be minimized by adjusting the positive biasing voltage on the filament. The cylindrical terminating electrodes 320 do not disturb the cylindrical symmetry of the electric field. Thus, throughout most of the space within the cylinders 258 and 260, the cylindrical symmetry of the field is maintained so as to foster and maintain the orbiting of the electrons in spiral paths around the central wire 256. Where such symmetry exists, there is nothing to disturb the electrons from their orbits until they collide with gas molecules. Thus, extremely long means free paths for the electrons have been obtained with the ion gauge 250 of FIG. 14. Thus, relatively large ion currents may be obtained while minimizing the electron current between the filament and the central wire. Inasmuch as the required emission of electrons is small, the filament may be very small, so that the heat generated by the filament may be kept low. The heating of the central wire due to electron bombardment may also be kept low. It is very desirable to minimize the amount of heat generated in the ion gauge, because such heat tends to affect the quality of the vacuum in the vacuum system.

FIG. 20 illustrates another embodiment of the invention in the form of an ion-getter vacuum pump 372, which is of the type in which titanium or some other suitable getter material is continuously evaporated so that the titanium vapor will condense on collecting surfaces in the pump. The spiraling electrons cause ionization of the gas molecules in the pump. The resulting positive gas ions are attracted to the collecting surfaces, where they are taken up and buried by the titanium getter.

In this case, the collecting surfaces are provided by a generally cylindrical metal casing or housing 374 having its ends closed and sealed by end-plates or walls 376 and 278. The casing 374 has an inner cylindrical surface 380 which serves as a primary collecting surface for the ions and the titanium getter, and also provides the outer cylindrical electrode of the electron orbiting device, corresponding generally to the outer cylindrical electrode 22 of FIG. 1. The inner cylindrical electrode takes the form of a heavy wire or rod 382 which is preferably made of tungsten or some other material which will withstand high temperatures. The rod 382 extends along the axis of the cylindrical surface 380.

As before, the electron orbiting device includes injecting means 384 adapted to inject electrons into the space between the outer and inner electrodes 380 and 382, with sufficient angular momentum to insure that many or most of the electrons will go into orbits around the axial rod 382. The illustrated injecting device 384 comprises a plurality of the same injectors 264 as employed in the embodiment of FIGS. 14 and 17. As illustrated in FIG. 20, four such injectors 264 may be employed and may be spaced at equal angular intervals around the axial rod 382 and at equal radial distances from the rod. It will be recalled that each injector 264 comprises an electron emiting filament 266 and a shield wire or electrode 268. Each filament 266 is parallel to the axial rod 382. Each shield wire 268 is positioned between the corresponding filament 266 and the axial rod 382 to prevent electrons from traveling directly between the filament and axial rod. The pump 372 will function with less than four filaments. In fact, if one or more of the filaments burn out or otherwise become inoperative, the operation of the pump may be continued on the basis of the electron emission of the remaining filament or filaments. The provision of a plurality of filaments increases the total electron emission and thereby increases the capacity of the pump.

As in the case of the embodiment of FIGS. 14 and 17, the device 372 of FIG. 20 employs a reflecting electrode in the form of a conductive metal sleeve or cylinder 390 which is received around the central rod 382 adjacent the filaments 266. The sleeve 390 is insulated from the axial rod 382, preferably by a bushing 392 made of ceramic or other suitable insulating material. The sleeve 390 may be mounted in an opening 394 formed in a metal bar or bracket 396. In this case, the bracket 396 is mounted on the upper end-plate 376 by means of a plurality of pillars 398 which support the bracket and also establish an electrical connection between the bracket and the end wall.

The electrical circuit for the pump 372 is similar to the circuits for the previously described devices. Thus, two leads 401 and 402 are connected to the filaments 266. A third lead 403 is connected to the axial rod 382. The leads 401, 402 and 403 are brought out of the housing 374 through glass feed-through insulators 404, 405 and 406 which extend through an are sealed into openings in the end-plate 376. The leads 401–403 are sealed into the insulators 404–406.

Power for heating the filaments 266 may be provided by a transformer 408 having a low voltage secondary winding 410 which is connected to the leads 401 and 402. The transformer 408 has a primary winding 412 which may be connected to a conventional source of alternating current represented by line wires 413 and 414.

The required voltage between the axial rod 382 and the cylindrical inner surface 380 of the casing 374 is provided by a suitable source of direct current, shown as a battery 415, having its positive terminal connected to the lead 403, and its negative terminal connected to the casing 374, the negative terminal also being grounded. A biasing voltage for the filament 266 is provided by a battery 416, or some other source of direct current. As shown, a potentiometer 417 is connected across the battery 416. The movable contact 418 of the potentiometer 417 is connected to a center tap 419 on the secondary winding 410. The negative terminal of the battery 416 is connected to the casing 374.

As in the case of the other electron orbiting devices, the filaments 266 emit electrons which are given sufficient angular momentum so that most of them go into spiral orbits around the positively charged axial rod 382. The reflecting electrode or sleeve 390 is at ground potential and is effective to reflect the spiraling electrons downwardly along the rod 382. Some of the spiraling electrons collide with gas molecules in the space within the pump casing 374. The resulting positively charged gas ions are attracted to the negatively charged inner surfaces of the casing 374. As shown, the pump casing 374 is connected by means of a tube or pipe 420 to the vacuum system with which the pump 372 is to be used. It will be understood that the vacuum system is initially evacuated to the maximum possible extent with the usual fore pumps. The purpose of the ion-getter pump 372 is to evacuate the vacuum system to a substantially higher vacuum than could normally be obtained with other types of pumps, and to maintain an extremely high vacuum over an extended period of time, even though gases may be evolved by various components in the vacuum system.

The orbiting electrons, spiraling around the axial rod 382, travel downwardly and strike a target 422 made of titanium or some other suitable getter. The electron bombardment heats the target 422 and causes evaporation of the titanium therefrom. The titanium vapor travels outwardly and condenses on the inner surfaces of the casing 374, particularly the inner cylindrical surface 380. The condensed titanium effectively takes up and buries the gas ions which are attracted to the inner surface of the casing 374. The combination of continuous condensation of the titanium getter on the collecting surfaces, the continuous propulsion of gas ions to the collecting surfaces, produces a high pumping rate, so that an extremely high vacuum can be achieved and maintained.

Preferably, the titanium target 422 is not melted but is heated to a temperature below the melting point of the titanium, but high enough to cause substantial evaporation of the titanium by sublimation, directly between the solid and vapor states. Such sublimation of titanium in an ion-getter pump is disclosed and claimed in the copending application of Raymond G. Herb, Serial Number 180,954, filed March 20, 1962.

The titanium target 422 preferably takes the form of a series or stack of titanium washers or discs 424 which are received around the axial rod 382, near its lower end. The discs 424 are preferably spaced apart to a slight extent from one another in the stack, so that the topmost disc 424 may be heated to a high temperature while the other discs in the stack remain at a relatively much lower temperature. Thus, the evaporation of the titanium is largely confined to the topmost disc, so that the disc will be successively consumed from the top to bottom in the stack. This arrangement makes it possible to provide an extremely large supply of titanium for evaporation in the pump. In this way, the operation of the pump can be continued for a long period of time. The evaporation of the topmost disc 424 does not affect the cylindrical symmetry of the electric field in the space between the electrodes 380 and 382, so that the electrons continue to orbit downwardly around the electrode 282 until they strike the topmost disc. The titanium discs 424 are preferably connected electrically to the axial rod 382 so that the discs will be given the same positive potential as the rod. However, to prevent excessive heating of the rod 382, the discs are preferably spaced outwardly from the rod. Thus, as shown in FIG. 21, each disc 424 is formed with a central opening 426 which is substantially larger in diameter than the rod 382. In the illustrated construction the discs 424 are confined and separated by a cage 428 comprising a plurality of wires or rods 430 which are welded or otherwise secured to the outside of a disc 432. The wires 430 project upwardly from the disc 432 and engage the outer edges of the titanium disc 424. Each of the discs 424 is preferably tack-welded to each of the wires 430 in order to maintain the slight spacing between the discs 424. The wires 430 and the disc 432 may be made of tungsten so as to withstand the high temperatures caused by the electron bombardment of the titanium discs 424.

The illustrated bracket 396 has a downwardly extending leg 440, and an arm 442 bent horizontally from the lower end of the leg 440. An insulator 444 may be mounted on the arm 442 to support the lower end of the axial rod 382. The disc 432 is mounted on the lower end portion of the axial rod 382 and thus is electrically connected thereto.

FIG. 23 illustrates a modified ion-getter pump 450 which in most respects is similar to the pump 372 of FIG. 20. The reference characters employed in FIG. 20 have been applied to similar components in FIG. 23, in order to avoid needless repetition in this description. Only the differences between the pumps 450 and 372 will be described in detail.

The pump 450 includes a modified electron orbiting device 451 having an outer generally cylindrical electrode in the form of an elongated coil or cage 452 which may be made of wire. The coil 452 is positioned coaxially around the central rod 382. As shown, the coil 452 is supported between rings 454 and 456, made of wire or the like. It will be seen that the rings 454 and 456 are formed with arms or brackets 458 and 460 which are welded or otherwise secured to the vertical leg 440 of the bracket 396. Pillars or brackets 462 are employed to connect the bracket 396 to the upper end-plate 376. Thus, the coil 452 is electrically connected to the casing 374. Accordingly, the coil 452 is at ground potential.

Instead of using four injectors, the pump 450 employs only two of the injectors 264. As before, each injector 264 comprises an electron emiting filament 266 and a shield wire 268. In addition to the three leads 401, 402 and 403, a fourth lead 466 is brought through an insulating seal 467 in the upper end-plate 376, but the lead 466 is connected directly to the lead 401 so that there is no difference in the electrical circuits of the pumps 450 and 372.

Instead of the large titanium washers or discs 424, the pump 450 of FIG. 23 employs smaller washers or discs 468 which are strung or mounted directly on the axial rod 382. The lowermost disc 468 may be tack-welded, press-fitted or otherwise securely mounted on the rod 382 so as to support the stack of discs, but the other titanium discs 468 may be loosely mounted on the rod 382 so as to minimize heat transfer between the discs and the rod. The discs 468 are preferably made with rough surfaces so as to minimize heat transfer between the successive discs in the stack. Thus, the heat generated through bombardment by the electrons traveling downwardly in spiral orbits around the central rod 382 is largely confined to the uppermost titanium disc 468 in the stack, so that the titanium is evaporated mostly from the uppermost disc. The stack of discs provides a large supply of titanium so that evaporation of all the titanium may continue over a long period of time. Generally, the pump 450 may be made somewhat smaller in size than the pump 372 of FIG. 20.

As before, the electrons emitted by the filaments 266 travel downwardly in spiral orbits around the rod 382 until the electrons strike the uppermost titanium disc 464. Some of the orbiting electrons collide with gas molecules and produce positive ions which are attracted outwardly by the wire coil 452. However, most of the positive ions travel outwardly through the spaces between the convolutions of the coil 452 and continue to travel outwardly until they strike the inside of the casing 374. The size of the wire employed in the coil 452 is small compared to the spacing between the convolutions of the coil, so that there is only a small chance that a positive ion will strike the coil itself.

Most of the titanium evaporated from the uppermost disc 468 passes outwardly through the openings between the convolutions of the coil 452, so that most of the titanium vapor condenses on the inside of the casing 374. As before, the gas ions are taken up and buried by the condensed titanium. Of course, some titanium will condense on the coil 452 and will take up and bury any gas ions which strike the coil. A shielding disc 472 may be provided over the top of the insulator 444 to prevent titanium from condensing on the insulator, which might cause leakage of current between the central rod 382 and the arm 442 of the bracket 396.

The provision of the coil or cage 452 makes it unnecessary to center the rod 382 in the casing 374. Moreover, the provision of the coil 452 eliminates any disturbance in the electric field due to the supporting bracket 396, particularly the vertical leg 440 thereof.

FIG. 26 illustrates another modified ion-getter vacuum pump 476 which includes all the components of the pump 450, shown in FIG. 23, plus an additional electron orbiting device 478 for increasing the extent to which the gas molecules are ionized, and thereby increasing the efficiency and pumping capacity of the pump. It will be seen that the second electron orbiting device 478 is alongside or parallel to the first electron orbiting device 451. However, the two electron orbiting devices 451 and 478 may be arranged end to end or in any other suitable manner. As shown in FIG. 26, the casing 374 is made large enough to accommodate both electron orbiting devices 451 and 478. The casing 374 may be either circular or elliptical in cross section.

The second electron orbiting device 478 comprises an outer generally cylindrical electrode in the form of an elongated coil or cage 480 which may be made of wire and may be connected between supporting rings 482 and 484. As shown, the rings 482 and 484 have supporting arms 486 and 488 which are welded or otherwise secured to vertical flanges or extensions 490 and 492 on the bracket 396.

The axial or central electrode for the orbiting device 478 is preferably in the form of a fine cylindrical wire 494 which extends axially through the coil 480. As explained in connection with FIG. 14, the use of a fine wire for the axial electrode increases the mean free path of the electrons which orbit around the axial electrode.

The second electron orbiting device 478 comprises electron injecting means 496 which may be the same as employed for the first electron orbiting device 451. Thus, as shown, the injecting means 496 comprises two of the injectors 264, each of which includes an electron emitting filament 266 and a shield wire 268.

The electron orbiting device 478 has reflecting electrodes or cylinders 390 at both ends of the coil 480 so as to confine the orbiting electrons to the space between the coil 480 and the central wire 494. The reflecting electrodes 390 may be the same as discussed in connection with FIGS. 20 and 22. Thus, each reflecting electrode 390 is in the form of a cylinder which is received around the central wire 494 and is insulated therefrom. The reflecting electrodes 390 project into the opposite ends of the coil 480. The reflecting electrodes 390 are mounted on the supporting members 396 and 492 and thereby are maintained at ground potential.

It will be understood that electrons are emitted from the filaments 266 and that most of the electrons have sufficient angular momentum to travel in spiral orbits around the central wire 494. The downwardly spiralling electrons are reflected upwardly by the cylindrical reflecting electrode 390, while the upwardly spiralling electrons are reflected downwardly by the upper electrode 390. Thus, the electrons may traverse a great many orbits around the central wire 494. Eventually, most of the electrons collide with gas molecules and generate positive ions which are attracted outwardly by the negatively charged coil 480. Some of the positive ions strike the coil 480 but most of them pass through the coil to the inner walls of the casing 374.

Because the electrons can spiral upwardly and downwardly repeatedly along the central wire 494, the electron orbiting device 478 provides an extremely long mean free path for the electrons. Thus, the ionization efficiency of the orbiting device 478 is much higher than that of the device 451. In the pump 476, the orbiting device 451 functions primarily as an evaporator of titanium getter, while the second orbiting device 478 produces most of the gas ionization in the pump. The combination of the two electron orbiting devices provides an extremely efficient pump which affords a high pumping rate.

The electrical circuit for the second orbiting device 478 is substantially the same as for the first orbiting device 451. It will be seen that the transformer 408 has an additional secondary winding 502 which is connected to the filaments 266 of the electron orbiting device 478. Leads 503, 504 and 505 are brought out from the filaments 266 through glass seals 506, 507 and 508, but the lead 505 is connected to the lead 503 outside the housing 374. The secondary winding 502 is connected to the leads 503 and 504.

Another lead 509 is brought out from the central wire 494 through a glass seal 510. A source of direct current, illustrated as a battery 512 is connected between the lead 509 and the casing 374, the positive terminal of the battery being connected to the lead 509. To bias the filaments 266 of the orbiting device 478, another battery 514 is connected across a potentiometer 516. The sliding contact 518 of the potentiometer 516 is connected to a center tap 519 on the winding 502. The negative terminal of the battery 514 is connected to the casing 374.

It would be possible to energize the second electron orbiting device 478 from the same direct current and alternating current supplies used to energize the first orbiting device 451. However, it is preferred to employ separate power supplies so that the electrode voltages of the two orbiting devices may be adjusted separately.

The major portion of the space between the axial wire 494 and the cylindrical coil 480 has an electric field which is cylindrically symmetrical so as to foster and maintain the orbiting of the electrons around the axial wire. The cylindrical reflecting electrodes 390 do not disturb the cylindrical symmetry of the electric field. The disturbing effect of the filaments 266 and their supporting wires 268 and 270 is slight, because of the positive biasing voltage on the filaments, and because the filaments occupy only a very small portion of the space between the coil 480 and the axial wire 494. In particular, the length of the filaments is much smaller than the length of the space between the coil 480 and the wire 494.

In some cases, the cylindrical coil 480 may be omitted, in which case the grounded outer casing 374 serves as the outer electrode of the ionizing device 478. By biasing the filaments 266 to a relatively high voltage, the orbits of the electrons may be confined to the space near the central wire 494, so that the electron orbits will not be disturbed to any serious extent by irregularities in the electric field at some distance from the central wire. For example, the filaments may be impressed with a positive biasing voltage of about 1,000 volts when the positive voltage between the central wire 494 and the casing 374 is about 5,000 volts.

In many or most cases, it is sufficient to use a single filament 266 and a single shield or deflecting electrode 268 for the ionizing device 478. Thus, one of the filaments 266 and its supporting wires 268 and 270 may be omitted from the ionizing device 478.

FIG. 27 illustrates another modified electron orbiting device 530 which may be used an as ion-getter vacuum pump. In this pump, titanium or some other suitable getter is vaporized by a sputtering process rather than by evaporation.

It will be seen that the orbiting device 530 comprises a cylindrical outer casing 532 which serves as the outer electrode. The central electrode is in the form of a fine wire 534 extending axially within the casing 532. The ends of the casing 532 are closed by plates or end walls 536 and 538. The side tube 540 is connected to the casing 532 and is adapted to be connected to the vacuum system with which the pump 530 is to be used.

As before, the orbiting device 530 is provided with an electron injecting device 542 which injects electrons into the space between the central wire 534 and the casing 532, with sufficient angular momentum to cause the electrons to go into orbits around the central wire. The injecting device 542 may be substantially the same as the injector 264 of FIG. 17. Thus, the injector 542 comprises the filament 266 and its supporting wires 268 and 270. The wire 268 is interposed between the filament 266 and the central wire 534 so as to act as a shield, for preventing the electrons emitted by the filament 266 from traveling directly to the central wire 534.

As before, the electron orbiting device 530 may be provided with the terminating electrodes or sleeves 320, as disclosed in detail in connection with FIG. 17. The terminating sleeves 320 are received around both end portions of the central wire 534 and are insulated therefrom.

To provide for sputtering of getter material, the electron orbiting device 530 is provided with a generally cylindrical getter electrode 550 which is mounted coaxially around the central wire 534, near the cylindrical outer casing 532. The getter electrode 550 is made of titanium or some other suitable getter. Positive gas ions are caused to bombard the getter electrode 550. Such bombardment causes sputtering of the titanium from the getter electrode. The resulting titanium vapor condenses on the outer casing 532. Some of the titanium may re-condense on the electrode 550. The freshly condensed or deposited titanium is highly efficient in taking up and burying gas molecules under high vacuum conditions, so as to provide an effective vacuum pumping action. The titanium is vaporized from the electrode 550 by sputtering, rather than by evaporation. The getter electrode 550 remains at a low temperature and is not heated to any great extent by the positive ion bombardment.

The generally cylindrical getter electrode 550 may assume a variety of forms, such as that of a smooth cylinder. However, the illustrated getter electrode 550 is skeletal in form and comprises a plurality of spaced or stacked coaxial rings 552 which may be made from thin titanium sheet metal. The rings 552 may be confined and supported by a generally cylindrical cage of longitudinal wires 554, to which the rings 552 may be welded or otherwise secured. The rings 552 and cage wires 554 may be spaced inwardly a short distance from the cylindrical casing 532.

The circuit for energizing the filament 266 may be the same as illustrated in FIG. 23. The high voltage for the central wire 534 may be provided by a direct current power supply 560 having positive and negative terminals 561 and 562. The positive terminal 561 is connected to the central wire 534 by a lead 564. In this case, a lead 566 extends between the negative terminal 562 and the getter electrode 550. The terminating electrodes 320 are also connected to the negative terminal 562 by leads 567 and 568.

The direct current power supply 560 is also adapted to provide a positive biasing voltage for the filament 266. Thus, the power supply 560 has a positive bias supply terminal 570. A lead 571 is connected between the terminal 570 and the center tap 419 of the filament winding 410. Of course, both the high voltage on the central wire 534 and the biasing voltage on the filament 266 may be varied to suit various operating conditions. Thus, for example, the high voltage on the central wire 534 may be about 5,000 volts, while the positive filaments bias may be about 1,000 volts.

Under some operating conditions, the outer casing 532 and the getter electrode 550 may be operated at the same voltage. Under other conditions, it may be desirable to provide a positive voltage between the outer casing 532 and the getter electrode 550. Such positive voltage may be derived from a direct current power supply 580 having positive and negative terminals 581 and 582. A lead 584 extends between the negative terminal 582 and the negative terminal 562 of the power supply 560. In this case, a single pole double-throw switch 586 is employed for connecting the casing 532 to either the positive terminal 581 or the negative terminal 582 of the power supply 580. When the casing 532 is connected to the negative terminal 582, the power supply 580 is effectively out of the circuit, and the outer casing 532 is at the same voltage as the getter electrode 550. The outer casing 532 is grounded, so that the getter electrode is also grounded under these conditions.

When the casing 532 is connected to the positive terminal 581, the voltage of the power supply 580 is applied between the casing 532 and the getter electrode 550 so that the casing is at a positive potential relative to the getter electrode. This positive potential is of assistance in attracting the molecules of the sputtered titanium getter to the casing 532. The voltage of the power supply 580 may be varied as desired, but, for example, may be about 5,000 volts. If the biasing voltage between the getter electrode 550 and the casing 532 is to be used at all times, the biasing voltage may be derived from the main power supply 560.

It will be understood that electrons emitted by the filament 266 go into orbits around the central wire 534. The orbiting electrons collide with gas molecules and cause ionization of the molecules. The positive gas ions are attracted to the getter electrode 500. Titanium is sputtered from the getter electrode 550 by impingement of the positive gas ions. The titanium thus vaporized is condensed or deposited on the outer casing 532, and also to some extent on the getter electrode 550 itself. The freshly deposited titanium takes up and buries gas molecules which are thus removed from the vacuum system.

FIG. 28 illustrates another modified getter-ion pump 600 which comprises a cylindrical metal casing 602, closed at one end by a plate or end wall 604. The other end of the casing 602 has an opening 606 which is adapted to be connected to the vacuum system with which the pump is to be used. Thus, the pumping is done through the open end 606 of the casing 602. In this case, the end wall 604 is at the upper end of the casing 602.

The pump 600 is provided with a central electrode in the form of a cylindrical rod 610. Normally the rod 610 is positioned axially within the casing 602. The upper end portion of the rod 610 is supported by an insulator 612 which is sealed around the rod 610 and is sealed into an opening 614 in the upper end plate 604, whereby the upper end of the rod 610 is brought out of the casing 602 so that an electrical connection may be made to the rod.

A cylindrical terminating electrode or sleeve 616 is preferably mounted around the upper end portion of the axial rod 610, just below the insulator 612. It will be understood that the terminating electrode 616 is insulated from the axial rod 610. The terminating electrode or sleeve 616 may be similar to the terminating electrode 320 disclosed in detail in connection with FIG. 17. As shown, the terminating electrode 616 is connected to the casing 602.

A direct current power supply 620 is employed to provide a high positive voltage between the central rod 610 and the cylindrical casing 602. For example, such voltage may be about 5,000 volts.

As in the case of the previously described embodiments, means are provided for introducing or injecting electrons into the space between the casing 602 and the central rod 610, in such a manner that the electrons will go into orbits around the central rod. The arrangement for injecting electrons may be essentially the same as disclosed in connection with FIG. 20. Thus, a plurality of electron injecting devices 264 are provided. Each device 264 comprises an electron emitting filament 266 and a shielding electrode or wire 268. The filaments 266 may be energized and biased in the same manner as described in connection with FIG. 20. To avoid needless repetition of description, the same reference characters have been employed in FIG. 28 as in FIG. 20, for the various components of the energizing and biasing circuits.

It will be seen that a cylindrical slug or target 624 is mounted on the central rod 610, near the lower end of the rod but spaced upwardly a substantial distance therefrom. Thus, the central rod 610 has a portion 626 which projects below the slug or target 624. As shown, the lower end portion 626 of the rod 610 terminates a substantial distance above the lower end of the casing 602. Preferably, the extreme lower end of the lower end portion 626 is free and unsupported by any insulator or the like.

The target or slug 624 may be made of titanium, or some other getter material, and may be cylindrical in form. In this case, it is not necessary to divide the cylindrical slug of titanium into washers or discs, as in the case of some of the other embodiments. It is preferred that the rod 610 be made of tungsten or some other material which will withstand high operating temperatures.

As in the case of the other electron orbiting devices, the electrons emitted by the filaments 266 go into orbits around the central rod 610. The orbiting electrons spiral downwardly around the rod 610. Many or most of the orbiting electrons will at first miss the titanium target or slug 624 and will continue to spiral downwardly around the slug 624 and around the lower end portion 626 of the rod 610. Most of the electrons which spiral to the lower end of the lower rod portion 626 are reflected upwardly by the electric field between the lower end of the lower rod portion 626 and the casing 602. The reflected electrons will continue to orbit around the lower rod portion 626 and will spiral upwardly. Again, many of the spiraling electrons will travel in orbits around the titanium slug 624 and the upper portion of the central rod 610. The electric field between the terminating electrode or sleeve 616 and the central rod 610 will cause most of the upwardly spiraling electrons to be reflected downwardly so that they will travel downwardly in spiral orbits around the rod 610. Thus, the orbiting electrons may spiral several times along the length of the central rod 610. In this way, the mean free path of the electrons is lengthened so that the number of gas ions produced by the electrons is increased.

Some of the orbiting electrons pass so close to the central rod 610 that they strike the titanium slug 624, either on the first pass along the central rod, or on subsequent passes, after the orbits of the electrons have been modified, by reflection at the ends of the central rod, by collision with gas molecules, or by other disturbing factors. Eventually, the titanium slug or target 624 intercepts many or most of the orbiting electrons. The resulting electron bombardment of the titanium slug 624 causes heating of the slug, so that the titanium is evaporated from the slug. Normally, the temperature of the slug is kept below the melting point of titanium, so that titanium is evaported by sublimation, directly from the solid state to the vapor state. The orbiting electrons strike the titanium slug 624 at various places along the slug, so that the slug is heated in a fairly uniform manner along its entire length.

The titanium vapor travels outwardly from the target or slug 624 and is condensed on the inner surface of the casing 602. The freshly condensed or deposited titanium takes up and buries gas molecules and ions. The orbiting electrons cause substantial ionization of the gas molecules in the space around the central rod 610. The positive gas ions are propeled to the outer casing 602 by the electric field between the casing and the central rod 610. When the ions strike the casing 602, they tend to be buried by the continuously deposited titanium getter. The efficient ionization of the gas molecules is particularly important in obtaining high pumping rates for the noble gases, such as argon and helium.

In actual tests, the construction of FIG. 28 has been found to be quite successful for a relatively small ion-getter pump having a casing with a diameter of about three inches. A pumping rate of 100 liters per second of air can be achieved with such a pump. A satisfactory pumping rate for the noble gases, such as argon, is also achieved.

FIG. 29 illustrates another modified ion-getter vacuum pump 700 which is similar to the pump 600 of FIG. 28. However, the construction of the pump 700 of FIG. 29 is particularly well adapted for pumps of relatively large sizes, while the construction of FIG. 28 is particularly applicable to smaller pumps. Thus, for example, the pump 700 of FIG. 29 may have a cylindrical casing 702. Merely by way of example, the casing 702 may be approximately twelve inches in diameter. The upper end of the casing 702 is closed by an end wall or plate 704. As shown, the casing 702 has an open lower end 706 which is adapted to be connected to the vacuum system with which the pump 700 is to be used. The pumping is done through the open lower end 706 of the casing 702.

The pump 700 is provided with an inner electrode in the form of a cylindrical rod 710, which is normally positioned along the axis of the casing 702. The upper end portion of the rod 710 is supported by an insulator 712 which is sealed around the rod and is sealed into an opening 714 in the end plate 704.

A cylindrical terminating electrode or sleeve 716 is preferably mounted around the upper end portion of the axial rod 710, below the insulator 712. The terminating electrode or sleeve 716 may be similar to the terminating electrode 320 disclosed in detail in connection with FIG. 17. While a biasing voltage may be applied to the terminating electrode 716, it is normally grounded to the casing 702.

A direct current power supply 720 is employed to provide a high positive voltage between the axial electrode 710 and the cylindrical casing 702. For larger sized pumps, it is preferred to use a relatively high voltage, such as 50,000 volts, for example.

As in the case of the previously described embodiments, means are provided for introducing or injecting electrons into the space between the casing 702 and the central rod 710 with sufficient angular momentum to cause the electrons to go into orbits around the central rod. The arrangement for injecting electrons may be essentially the same as disclosed in connection with FIGS. 20 and 28 and may comprise a plurality of electron emitting filaments 266 and shield wires 268. The filaments 266 may be energized and biased in the same manner as described in connection with FIG. 20. To avoid repetition of description, the same reference characters have been employed in FIG. 29 as in FIG. 20, for the various components associated with the filaments 266.

It will be recalled that in the pump of FIG. 28, a slug of getter material is mounted on the central rod. In the case of the pump 700 of FIG. 29, the central rod 710 is provided with a plurality of enlarged slugs or targets 724 of titanium or other suitable getter material. Three such titanium slugs 724 are employed in the specific construction shown in FIG. 29. The titanium slugs 724 are mounted at spaced points along the central rod 710. As shown, one slug is near the filaments 266, one is near the opposite end of the rod 710, and one is near the center of the rod. The exact positions of the titanium slugs may be varied as necessary. Any desired number of slugs may be mounted on the central rod. The slugs may be press-fitted, welded or otherwise secured to the central rod 710.

The general operation of the pump 700 is similar to that of the pump 600 of FIG. 28. Many of the electrons emitted by the filaments 266 go into spiral orbits around the positively charged central rod 710. Eventually, many of the spiraling electrons strike the titanium slugs 724, although the electrons may spiral several times along the length of the rod 710 before finally striking one of the titanium slugs 724. The spiraling electrons are reflected upwardly at the lower end of the central rod 710 by the electric field between the lower end of the rod 710 and the casing 702. Near the upper end of the casing 702, the upwardly spiraling electrons are reflected downwardly by the field between the terminating electrode 716 and the central rod 710.

The construction of FIG. 29 promotes the maintenance of the orbits of the electrons, so that the mean free path of the electrons is particularly long. Thus, the extent to which the molecules within the casing 702 are ionized is great. With the construction of FIG. 29, the biasing voltage on the filaments 266 is normally adjusted to maintain the orbits of the electrons to the greatest possible extent, and thereby obtain the greatest possible ionization of the gas molecules within the casing 702.

Inasmuch as many of the orbiting electrons eventually strike the slugs 724, all three slugs are heated by electron bombardment. The heating of the slugs causes vaporization of the titanium. Normally, the temperatures of the titanium slugs 724 are kept below the melting point of titanium so that liquid titanium is not present. Thus, the titanium is vaporized by sublimation, directly between the solid and vapor state.

The pump 700 of FIG. 29 embodies various other refinements and improvements which in many cases are not needed, but which tend to improve the pumping action. Thus, the pump 700 may optionally be equipped with means for producing a relatively weak magnetic field directed parallel to the axis of the central rod 710. Such magnetic field may be produced by one or more coils 730 wound around the outside of the casing 702. As shown, the coils 730 are energized with current from a battery 732, or some other source of direct current. A switch 734 and a potentiometer 736 may be connected between the battery 732 and the coils 730 to shut off and control the current through the coils. In many cases, it will not be necessary or even desirable to energize the coils 730. However, the axial magnetic field produced by the coils 730 tends to increase the ionization of gas molecules within the casing 702, so that ion pumping speed will be increased. Moreover, the axial magnetic field tends to protect the pump against stray magnetic fields which may otherwise tend to disturb the orbiting of the electrons. It will be understood that axial magnetic fields may be employed, if desired, with all of the electron orbiting devices disclosed in this application. The use of an axial magnetic field is particularly advantageous for electron orbiting devices of large sizes.

As another optional improvement the pump 700 of FIG. 29 is provided with means for increasing and controling the heating of the titanium slugs or targets 724. This may be done by providing a supplementary source of electrons for bombarding each of the titanium slugs 724. Such source may comprise a thermionic filament or cathode 740. As shown, each filament 740 is opposite the corresponding titanium slug 724. Preferably, each filament 740 is approximately flush with the inner surface of the casing 702 and is parallel to the central rod 710. When additional heating of any particular slug 724 is needed, the corresponding filament 740 may be heated to emit electrons, which are propelled to the slug 724 by the electric field due to the high positive voltage on the central rod 710.

Various arrangements may be provided for mounting the supplementary filaments 740 in the casing 702. In the illustrated construction, the casing 702 has a series of side tubes 742, one for each filament 740. Each side tube is closed by a removable plate 744.

Each filament 740 may be in the form of a fine tungsten wire extending between a pair of heavier lead wires 746 and 748. It will be seen that the lead wires 746 and 748 are brought out of the casing 702 through insulators 750 sealed into the plate 744.

Means are provided to supply current for heating each of the filaments 740. Thus, in each case, the filament leads 746 and 748 are connected to the secondary winding 752 of a filament transformer 754. The primary winding 756 of the transformer 754 may be energized from alternating current power lines 758 and 759. A variable auto-transformer 762 and a switch 764 may be connected between the primary winding 756 and the power lines 758 and 759 so that the current through the corresponding filament 740 may be regulated or shut off, as desired. Each filament 740 is preferably provided with separate means for regulating the current through the filament, so that the heating of each of the titanium slugs 724 may be individually regulated.

Normally the filaments 740 may be kept at the same direct current potential as the casing 702, but in some cases it may be desirable to provide a positive or negative biasing voltage on the filament. In the case of the central filament 740 in FIG. 29, the center tap 768 of the secondary winding 752 is grounded, so that the filament is at the same potential as the casing 702. This represents the typical arrangement. In the case of the upper and lower filaments 740, the center tap 768 is connected to a biasing battery 770 through a potentiometer 772. The upper filament 740 is positively biased, which normally tends to decrease the heating of the titanium slug 724, while the lower filament 740 is negatively biased, which increases the voltage between the filament and the titanium slug 724 and thereby tends to increase the heating of the slug.

We claim:
1. An electronic device,
comprising the combination of an anode consisting of an elongated substantially cylindrical rod-like member,
a generally cylindrical boundary electrode extending around said anode and spaced outwardly therefrom,
means forming a vacuum space including the interior of said boundary electrode,
and an elongated electron emitting cathode disposed in said vacuum space between said anode and said boundary electrode,
said elongated cathode being substantially parallel to said anode and disposed solely toward one end thereof for modifying the electric field between said anode and said boundary electrode whereby the electrons emitted by said cathode are given sufficient angular momentum to go into spiral orbits around said anode without the aid of a magnetic field.
2. A device according to claim 1,
in which said cathode comprises a thermionic filament.
3. A device according to claim 1,
including an elongated shield electrode positioned between said electron emitting cathode and said anode to prevent direct movement of the electrons from said electron emitting cathode to said anode.
4. A device according to claim 3,
in which said cathode comprises a thermionic filament having one end connected to and supported by the corresponding end of said shield electrode.
5. A device according to claim 1,
in which said anode is in the form of a cylindrical wire.
6. A device according to claim 1,
comprising means for producing a positive voltage on said anode relative to said boundary electrode.
7. A device according to claim 6,
comprising means for biasing said electron emitting cathode relative to said boundary electrode to a positive voltage substantially less than the voltage on said anode.
8. An electronic device,
comprising the combination of an elongated anode which is generally circular in cross section,
a boundary electrode extending around said anode and spaced outwardly therefrom,
means forming a vacuum space including the interior of said boundary electrode and the region around said anode, an elongated electron emitting cathode disposed in said vacuum space between said anode and said boundary electrode and generally parallel to said anode, and an elongated shield electrode positioned between said cathode and said anode for modifying the electric field therebetween whereby the electrons emitted by said cathode are given sufficient angular momentum to go into orbits around said anode.

9. An electronic device,
comprising the combination of an elongated anode which is generally circular in cross section,
a boundary electrode extending around said anode and spaced outwardly therefrom,
means forming a vacuum space including the interior of said boundary electrode and the region around said anode,
an electron emitting cathode in the form of a thermionic filament disposed between said anode and said boundary electrode and generally parallel to said anode,
and a shield wire adjacent said filament and substantially parallel thereto,
said shield wire being positioned between said filament and said anode for preventing direct movement of said electrons therebetween whereby the electrons emitted by said filament are given sufficient angular momentum to go into orbits around said anode.

10. A device according to claim 9,
in which the length of said filament is only a minor fraction of the length of said anode,
and in which said filament and said shield wire are disposed toward one end of said anode.

11. An electronic device,
comprising the combination of an elongated substantially cylindrical anode,
a generally cylindrical boundary electrode extending around said anode and spaced outwardly therefrom,
means forming a vacuum space including the interior of said boundary electrode,
an elongated electron emitting cathode disposed in said vacuum space between said anode and said boundary electrode,
said elongated cathode being generally parallel to said anode and disposed toward one end thereof for modifying the electric field between said anode and said boundary electrode whereby the electrons emitted by said cathode are given sufficient angular momentum to go into orbits around said anode without the aid of a magnetic field,
and an annular reflecting electrode received around said anode toward one end thereof for reflecting the orbiting electrons,
said electron emitting cathode being disposed toward the end of said anode adjacent said annular reflecting electrode.

12. An electronic device,
comprising the combination of a hollow generally cylindrical boundary electrode,
means forming a vacuum space including the interior of said boundary electrode,
a cylindrical anode extending axially within said boundary electrode,
said boundary electrode being spaced outwardly from said anode,
means for injecting electrons into the space between said anode and said boundary electrode with substantial angular momentum about said anode so that the electrons will travel in spiral orbits around said anode without the aid of a magnetic field,
and a generally cylindrical reflecting electrode received around at least one end portion of said anode and spaced outwardly therefrom for reflecting the orbiting electrons.

13. A device according to claim 12,
comprising a second generally cylindrical reflecting electrode received around the opposite end portion of said anode and spaced outwardly therefrom for reflecting the orbiting electrons.

14. A device according to claim 12,
comprising means for electrically connecting said cylindrical reflecting electrode to said boundary electrode.

15. A device according to claim 12,
comprising means for producing a positive voltage on said anode relative to said boundary electrode.

16. A device according to claim 15,
comprising means for giving said cylindrical reflecting electrode substantially the same potential as said boundary electrode.

17. An electron device,
comprising the combination of an anode consisting of an elongated substantially cylindrical rod-like member
a generally cylindrical boundary electrode extending around said anode and spaced outwardly therefrom,
means forming a vacuum space including the interior of said boundary electrode,
and an elongated electron emitting cathode disposed in said vacuum space between said anode and said boundry electrode,
said elongated cathode being substantially parallel to said anode and disposed solely toward one end thereof for modifying the electric field between said anode and said boundary electrode whereby the electrons emitted by said cathode are given sufficient angular momentum to go into spiral orbits around said anode without the aid of a magnetic field,
said anode having at least one free end portion remote from any part of said boundary electrode for producing in electric field therebetween to reflect the spiralling electrons.

18. A device according to claim 17,
in which said free end portion of said anode terminates within said boundary electrode and substantially short of the corresponding end of said boundary electrode.

19. A device according to claim 17,
in which said boundary electrode has at least one open end,
and in which said free end portion of said anode extends through and substantially beyond said open end of said boundary electrode.

20. An electronic device,
comprising the combination of a hollow generally cylindrical boundary electrode,
means forming a vacuum space including the interior of said boundary electrode,
a cylindrical anode extending axially within said boundary electrode,
said boundary electrode being spaced outwardly from said anode,
means for injecting electrons into the space between said anode and said boundary electrode with substantial angular momentum about said anode so that the electrons will travel in spiral orbits around said anode without the aid of a magnetic field,
an annular electrode received around at least one end portion of said anode and spaced outwardly therefrom,
and means for producing a biasing voltage on said annular electrode relative to said boundary electrode for reflecting the orbiting electrons.

21. An electronic device,
comprising the combination of an elongated anode which is generally circular in cross section,
a boundary electrode extending around said anode and spaced outwardly therefrom,
means forming a vacuum space including the region around said anode and the interior of said boundary electrode, and a plurality of elongated electron emitting cathodes spaced around said anode and disposed in said vacuum space between said anode and said boundary electrode and generally parallel to said anode, each of said cathodes having an elongated shield electrode positioned between said cathode and said anode for modifying the electric field therebetween whereby the electrons emitted by said cathode are given sufficient angular momentum to go into orbits around said anode.

22. A device according to claim 21,
in which each of said cathodes comprises a thermionic filament.

23. An electronic device,
comprising the combination of a hollow generally cylindrical boundary electrode,
a cylindrical anode extending axially within said boundary electrode,
said boundary electrode being spaced outwardly from said anode,
means forming a vacuum space including the interior of said boundary electrode and the region around said anode,
means including an electron emitting cathode disposed between said anode and said boundary electrode for injecting electrons into the space therebetween with substantial angular momentum about said anode so that the electrons will travel in spiral orbits around said anode,
and an ion collector electrode adjacent but separate from said boundary electrode.

24. An electronic device,
comprising the combination of a hollow generally cylindrical boundary electrode,
a cylindrical anode extending axially within said boundary electrode,
said boundary electrode being spaced outwardly from said anode,
means forming a vacuum space including the interior of said boundary electrode and the region around said anode,
means including an electron emitting cathode disposed between said anode and said boundary electrode for injecting electrons into the space therebetween with substantial angular momentum about said anode so that the electrons will travel in spiral orbits around said anode,
and a generally cylindrical ion collector electrode disposed around said anode and coaxial with said boundary electrode.

25. A device according to claim 24,
in which said ion collector electrode and said boundary electrode are arranged end to end.

26. A device according to claim 24,
in which at least a portion of said boundary electrode is received within said ion collector electrode.

27. A device according to claim 24,
including means for measuring the ion current to said ion collector electrode.

28. An electronic device,
comprising the combination of a hollow generally cylindrical boundary electrode,
a cylindrical anode extending axially within said boundary electrode,
said boundary electrode being spaced outwardly from said anode,
means forming a vacuum space around said anode and within said boundary electrode,
an elongated electron emitting cathode disposed between said anode and said boundary electrode and generally parallel to said anode,
an elongated shield electrode positioned between said cathode and said anode for modifying the electric field therebetween whereby the electrons emitted by said cathode are given sufficient angular momentum to go into orbits around said anode,
and a generally cylindrical ion collector electrode coaxial with said boundary electrode and disposed around said anode.

29. A device according to claim 28,
comprising means for producing a positive voltage on said anode relative to said boundary electrode and said ion collector electrode,
and means for measuring the ion current to said ion collector electrode.

30. A device according to claim 29,
comprising means for producing a positive biasing voltage on said cathode and said shield electrode relative to said boundary electrode,
said biasing voltage being substantially less than said voltage on said anode.

31. An electronic device,
comprising the combination of a hollow generally cylindrical boundary electrode,
means forming a vacuum space including the interior of said boundary electrode,
a cylindrical anode extending generally in an axial direction within said boundary electrode,
said boundary electrode being spaced outwardly from said anode,
means for injecting electrons into the space between said anode and said boundary electrode with substantial angular momentum about said anode so that electrons will travel in spiral orbits around said anode,
and an enlarged body of getter material mounted on and projecting outwardly from said anode for bombardment by the spiralling electrons.

32. A device according to claim 31,
in which said body is in the form of a generally cylindrical member of getter material.

33. A device according to claim 32,
in which said cylindrical member is divided into a series of discs of getter material.

34. A device according to claim 31,
including at least one additional body of getter material mounted on and projecting outwardly from said anode.

35. A device according to claim 30,
comprising a supplementary electron emitter disposed opposite the body of getter material for providing additional electrons to bombard said body.

36. An electronic device,
comprising the combination of a hollow ion collector electrode,
means forming a vacuum space including the interior of said ion collector electrode,
a hollow generally cylindrical boundary electrode disposed within said ion collector electrode,
a generally cylindrical anode extending axially within said boundary electrode,
said boundary electrode being spaced outwardly from said anode,
and means for injecting electrons into the space between said anode and said boundary electrode with substantial angular momentum about said anode so that said electrons will travel in spiral orbits around said anode,
said boundary electrode having an open structure to provide for passage of ions through said boundary electrode to said ion collector electrode.

37. A device according to claim 36,
in which said boundary electrode comprises a generally cylindrical cage.

38. A device according to claim 36,
in which said boundary electrode comprises a generally helical coil of wire.

39. A device according to claim 36, in which said boundary electrode comprises a series of spaced rings.

40. A device according to claim 36, in which getter material is provided on said boundary electrode and is adapted to be sputtered by ion bombardment.

41. An electronic device, comprising the combination of an elongated substantially cylindrical anode, a generally cylindrical boundary electrode extending around said anode and spaced outwardly therefrom, means forming a vacuum space including the interior of said boundary electrode, a cylindrical reflecting electrode received around said anode toward one end thereof and of a diameter substantially less than the diameter of said boundary electrode, and an elongated electron emitting cathode disposed in said vacuum space between said anode and said boundary electrode, said elongated cathode being generally parallel to said anode and disposed toward the end thereof adjacent said reflecting electrode for modifying the electric field between said anode and said boundary electrode whereby the electrons emitted by said cathode are given sufficient angular momentum to go into spiral orbits around said anode without the aid of a magnetic field, said reflecting electrode being effective to reflect the spiralling electrons.

42. An electronic device, comprising the combination of a hollow ion collector electrode, means forming a vacuum space including the interior of said ion collector electrode, a plurality of hollow generally cylindrical boundary electrodes disposed within said ion collector electrode, a plurality of generally cylindrical anodes extending axially within said respective boundary electrodes, said boundary electrode being spaced outwardly from the corresponding anode, means for injecting electrons into the space between each anode and the corresponding boundary electrode with substantial angular momentum about said anode so that the electrons will travel in spiral orbits around said anode, each boundary electrode having an open structure to provide for passage of ions through said boundary electrode to said ion collector electrode, and a target of getter material mounted on and projecting outwardly from one of said anodes for bombardment by the spiralling electrons to vaporize the getter material.

43. An electronic device, comprising the combination of an anode consisting of an elongated substantially cylindrical rod-like member, a rotationally symmetrical boundary electrode extending around said anode and spaced outwardly therefrom, means forming a vacuum space including the interior of said boundary electrode, and an elongated electron emitting cathode disposed in said vacuum space between said anode and said boundary electrode, said electron emitting cathode being disposed solely toward one end of said anode generally parallel thereto and having a length constituting only a minor fraction of the length of said anode for modifying the electric field between said anode and said boundary electrode whereby the electrons emitted by said electron emitting cathode are given sufficient angular momentum to go into spiral orbits around said anode without the aid of a magnetic field.

References Cited by the Examiner
UNITED STATES PATENTS

| | | | |
|---|---|---|---|
| 2,131,897 | 10/1938 | Malter | 230—69 |
| 2,556,254 | 6/1951 | Carne | 313—178 |
| 3,051,868 | 8/1962 | Redhead | 315—108 |
| 3,118,077 | 1/1964 | Gabor | 313—7 |

GEORGE N. WESTBY, *Primary Examiner.*

C. R. CAMPBELL, *Assistant Examiner.*